United States Patent [19]
Gutowitz

[11] Patent Number: 5,365,589
[45] Date of Patent: Nov. 15, 1994

[54] METHOD AND APPARATUS FOR ENCRYPTION, DECRYPTION AND AUTHENTICATION USING DYNAMICAL SYSTEMS

[76] Inventor: Howard A. Gutowitz, 6395 Claremore La., San Diego, Calif. 92120

[21] Appl. No.: 832,476

[22] Filed: Feb. 7, 1992

[51] Int. Cl.$^5$ .............................................. H04K 1/00
[52] U.S. Cl. ......................................... 380/43; 380/28; 380/49
[58] Field of Search ........................ 380/21, 23, 25, 28, 380/30, 43, 46, 49, 50; 364/717

[56] References Cited

U.S. PATENT DOCUMENTS

| | | | |
|---|---|---|---|
| 4,691,291 | 9/1987 | Wolfram | 364/717 |
| 4,723,284 | 2/1988 | Munck et al. | 380/25 |
| 4,979,832 | 12/1990 | Ritter | 380/28 |
| 5,003,597 | 3/1991 | Merkle | 380/28 X |
| 5,048,086 | 9/1991 | Bianco et al. | 380/28 |
| 5,142,577 | 8/1992 | Pastor | 380/21 |

*Primary Examiner*—Tod R. Swann
*Attorney, Agent, or Firm*—Michael J. Desha

[57] ABSTRACT

A method and apparatus provide encryption, decryption and authentication of messages using dynamical systems. The method and apparatus preferably operate on an information stream which may comprise message information, authentication information, and random or pseudo-random information. The initial secret keys of the system are a collection of dynamical systems, at least one of which is irreversible. These keys operate on states of the dynamical systems into which the message has been encoded. To initialize the encryption, a subset of the secret keys are selected to be current keys, and the desired message is encoded into the initial states. Encryption continues over a plurality of cycles. During each cycle the current keys are applied either backward or forward in time to their current states, over a plurality of sub-cycles. If during an encryption cycle an irreversible dynamical system is iterated in the backward direction, the choice of antecedent states may either be made randomly or according to information from the input information stream. After all encryption cycles have been performed, the current states of the dynamical system constitute the ciphertext. The ciphertext may then be decrypted by a method similar to the encryption method. In the preferred embodiment, random noise is diffused into the plaintext during encryption, and eliminated during decryption. The apparatus of encryption and decryption in the preferred embodiment operates with parallel hardware using only bit operations and table lookup; it may thus be made to operate in an exceedingly fast manner.

44 Claims, 10 Drawing Sheets

ITERATIVE ENCRYPTION

METHOD AND APPARATUS FOR ENCRYPTION, DECRYPTION AND AUTHENTICATION USING DYNAMICAL SYSTEMS

BACKGROUND OF THE INVENTION

1. Field of the Invention

The invention relates to cryptography and more particularly to a method and apparatus for encryption, decryption, and authentication of messages using dynamical systems.

2. Description of Related Art

Dynamical systems have been intensively studied in the academic community during the last two decades, especially as models of physical systems. A dynamical system is a set of quantities called the states of the system and a rule for mapping each state forward in time to other states.

A much-studied dynamical system is the logistic map. In a logistic map, the states of the system are real numbers x, and the rule by which the state $x^t$ at time t of the system maps to a next state $s^{t+1}$ is given by $x^{t+1}=4\lambda x^t(1-x^t)$ where $\lambda$ is a real number between 0 and 1. The logistic map exhibits either simple or complex behavior depending on the value of the control parameter $\lambda$. For an introduction to dynamical systems see "Determinstic Chaos" by H. G. Schuster (Physik-Verlag, 1984). For popular account of the field see "Chaos" by J. Gleick (Penguin Books, 1988).

There have been previous attempts to use dynamical systems in a cryptographic scheme.

One is described in a patent issued to M. Bianco and D. Reed, U.S. Pat. No. 5,048,086, a second is described by S. Wolfram (Proceedings of Crypto '85, pp. 429–432), a third is introduced in an article entitled "Cellular Automation Public-Key Cryptosystems" by P. Guan (Complex Systems 1, 1987), and a fourth, by J. Kari, is discussed by J-P Delahaye ("Les Automates", in Pour La Science, Nov. 1991, pp. 126–134). The first two references will be treated here as a pair since they resemble each other closely, then the second pair of reference will be considered.

Each of these first two references teaches the forward iteration of a particular dynamical system to generate a stream of pseudo-random numbers for use in encrypting. This stream is then combined with the plaintext using an XOR operation to produce a ciphertext. A receiver of the ciphertext who is in possession of the seed of the pseudo-random number generator can regenerate the stream used in encryption by again forward iterating the dynamical system. The pseudo-random numbers can be again XOR'ed with the ciphertext to recover the plaintext.

The schemes in these reference differ from each other mainly according to which dynamical system is used to generate the pseudo-random numbers. As described in U.S. Pat. No. 5,048,086, the logistic map is used as the pseudo-random number generator. The key of the system comprises the seed of the pseudo-random number generator and the parameter value of the map. In the article by Wolfram, a particular cellular automaton, known as rule 30, is used as the pseudo-random number generator. The key is the initial state of the cellular automaton.

The encryption systems taught by these two references suffer practical drawbacks including, but not limited to, the following:

The quality of the random numbers generated has not been well-established. Though Wolfram conducted extensive statistical tests on the quality of the pseudo-random numbers generated by rule 30 (see S. Wolfram, Adv. Applied Math 7, 1986) no mathematical proof has been found. The situation is worse in respect of the method taught in U.S. Pat. No. 5,048,086, since it is known that the bit sequences generated using the logistic map will not be random for most choices of the parameter in the map. The structure in the generated bit strings could be used by a code breaker to discover the key and obtain the message.

The quality of encryption can vary greatly depending on which key is chosen, and it may be difficult to choose good keys.

These systems, like many systems which use an XOR of the plain-text with a bit string, are vulnerable to chosen-plaintext crypt-analytic attack.

It will also be appreciated that these methods suffer major conceptual drawbacks including, but not limited to, the following:

The dynamical system is used to operate on information given in the key to generate further information (a pseudo-random bit stream) which is combined only at the end of the process, so to speak externally, with the plaintext.

The possible choices of dynamical systems which can be used to build cryptographic systems along these lines are limited. One must choose a dynamical system, or equivalently, parameters in a dynamical system, such that the dynamical system is strongly chaotic on almost all choices of initial condition. Proving such properties is an active area of academic research. End-users of cryptographic methods cannot be expected to conduct such research on each key they use in order to have faith in their cryptographic system.

In the second pair of systems, those taught by Guan and Kari, a reversible cellular automaton is carefully constructed so that another cellular automaton which is the original cellular automaton's inverse can be found by solving a complicated system of equations. Encryption is performed by applying the cellular automaton in the forward direction to the message. Decryption is performed by applying the inverse cellular automaton to the ciphered message. The security of the system depends on the difficulty of solving for the inverse cellular automaton. As will be brought out below in the discussion of the present invention, there are many fundamental differences between the methods taught by Guan and Kari and the present invention.

SUMMARY OF THE INVENTION

It is therefore an object of this invention to provide a cryptographic system which is 1) resistant to codebreakers and tamperers using any method of attack. 2) such that even for a fixed key, each plaintext corresponds to a large number of ciphertexts.

It is another object to provide a cryptographic system which is fast, using a minimum of operations in both hardware and software implementations.

It is yet another object to provide a cryptographic system which is implementable on computers with parallel architecture and implementable without floating-point arithmetic.

Still another object is to provide a cryptographic system which is not based on any unproven number-theoretic conjecture.

It is also an object to provide a cryptographic system which is not restricted by a fixed block size, and hence useful in data-base applications.

It is yet a further object to provide a cryptographic system which is able to embody self-synchronizing stream cryptographic capability, error-correction capability, and partial encryption/decryption capability.

In one aspect of the invention there is provided a method for encrypting information comprising the steps of establishing a plurality of dynamical systems to be used as keys for encryption;

selecting from said plurality of dynamical systems a plurality of current-key dynamical systems to be used as current keys for encryption;

choosing at least one of said current-key dynamical systems, the chosen dynamical system being an irreversible dynamical system;

defining a current state of at least one of the current-key dynamical systems in correspondence with at least a portion of the information to be encrypted; and applying said at least one of said current-key dynamical systems over a selected number of iteration cycles to produce from said current state a new state of said at least one of said current-key dynamical systems, said new state representing an encryption of the information.

In another aspect of the invention there is provided apparatus for the encryption and decryption of a message comprising:

a first memory array for storing values; first data processing means connected to the first memory array, said first data processing means being operative for setting values into said first memory array in correspondence with a description for a selected dynamical system;

a second memory array for storing a current state of the selected dynamical system along with other input information; and second data processing means connected to the first and second memory arrays for operating on data stored in said second memory array in accordance with the values in the first memory array to derive a new state of the selected dynamical system, respective ones of said states corresponding to the message and an encryption of the message.

Aspects of the invention in relation to the objects are discussed below.

Resistance to code-breaking and tampering. The resistance to code-breaking and tampering of encryption with this invention is due in part to the difficulty of finding the key used for encryption from intercepted ciphertext, or by encrypting chosen plaintext. Keys are chosen randomly from a very large set. A typical implementation might for instance use radius-12 toggle rules (see below) of which there are roughly $10^5 \times 10^6$ (1 followed by 5 million zeros). For such a system, brute-force search is clearly impossible. As demonstrated below, a one-bit error in guessing the key, the plaintext corresponding to a ciphertext or the ciphertext corresponding to a plaintext is sufficient to garble the message.

Each plaintext corresponds to many ciphertexts. Part of the security of this invention is due to its property of associating many ciphertexts to each plaintext, given a fixed key. Again using the example of radius-12 rules, if encryption is carried out for 100 steps (a reasonable value) then to each plaintext there are $2^{2400}$ associated ciphertexts. This means that even if a code-breaker manages to discover a ciphertext-plaintext pair, this information will be of no use in decrypting another encipherment of the same plaintext.

Fast Operation. The preferred embodiment of this invention uses cellular automata as underlying dynamical systems. Their simplicity allows for fast operation in easily-manufactured parallel hardware. A software simulation of this invention has achieved encryption/decryption rates of 20,000 bits/second, running on a standard workstation. This is comparable with the best hardware implementations of public-key cryptosystems. When this invention is embodied in special-purpose hardware, encryption/decryption rates 100 to 1,000,000 times faster than this software simulation speed should be possible. This estimate is made on the basis of currently available integrated circuit manufacturing techniques.

Implementable on computers with massively parallel architecture. Cellular automata are the simplest kind of massively parallel computer. In the preferred embodiment of this invention, the operations of both encryption and decryption are designed so that each of many different data processors can independently execute part of the computation.

Implementable without floating-point arithmetic. Floating-point operations tend to be slow compared with bit operations. Further, operations calling for floating-point manipulation of numbers may be subject to round-off errors. The preferred embodiment of this invention avoids these problems by using only bit and table lookup operations.

Not based on any unproven number-theoretic conjecture. The security of many of the most popular cryptographic methods is founded on one or more unproven conjectures in number theory. This invention achieves excellent security without appealing to any unproven number-theoretic conjecture.

Useful in Data-Base Applications. The property possessed by this invention whereby each time a given plaintext is encrypted with a given key there results a different ciphertext is an important advantage in data-base applications. Data-base encryption poses a particularly difficult problem for encryption methods which always encrypt a given plaintext block in the same way. A data base is typically composed on a list of records, each containing a plurality of fields each labeled in a stereotyped way. If this label is always encrypted in the same way, the ciphertext can be scanned to find the label. Even if tampers cannot decrypt the label, they may be able to use their knowledge of the location of the label in the ciphertext to help insert fraudulent information. This problem will not arise in data-base encryption with this invention.

Block length is not fixed. A further property of this invention useful in data-base applications is that the block length is not fixed, such as it is fixed, for instance, in the Data Encryption Standard (DES). (For information on the DES, see, for instance, E. Denning. Cryptography and Data Security, Addison-Wesley, 1982). In accordance with the present invention, blocks may be as small as one bit, or as large as the entire data base. The length of fields in a data base are seldom an exact multiple of a fixed encryption block length; hence, in a standard fixed-block-length encryption, field information must be padded in order to fit into a fixed block. This has two drawbacks—the padding could provide to a code-breaker partial information about the code and padding is wasteful of information channel capacity. These problems can be avoided by using the present invention for encryption of data bases.

Embodies self-synchronizing stream cryptographic capability. A key stream is used when it is desired to encrypt different parts of a message with different keys. A particularly useful type of key stream is one automatically synchronized with the stream of ciphertext. The self-synchronizing key streams which may be generated with this invention are discussed below.

Embodies error-correction capability. Error correction is needed when encrypted messages are transmitted across noisy channels. Many easily implemented approaches to error correction are possible with this invention.

Embodies partial encryption/decryption capability. Essentially any prior-art encryption method may be composed with another prior-art encryption method to multiply encrypt a given message, but there is no advantage in doing so. In prior-art methods no information is extracted by the process of encryption itself. This invention however, incorporates a dynamical I/O which allows information to be extracted during decryption by one set of dynamical systems, leaving more information to be extracted by another set of dynamical systems.

The basic feature of dynamical systems relevant to this invention is that they may be iterated both forward and backward in time. For instance, to iterate the logistic map forward in time an initial state $x^0$ and a value $\lambda$ are chosen. Then the equation defining the logistic map is applied to produce a state $x^1$. This process may be continued indefinitely, producing states $x^2, x^3, \ldots$ The logistic map, like many dynamical systems, is irreversible. This means that to some states there corresponds more than one antecedent state. The antecedent states $x^{t-1}$ for a state $x^t$ of the logistic map are given by $$\frac{1 \pm \sqrt{1 - \frac{x^t}{\lambda}}}{2}.$$

To iterate the state $x^t$ backward under the logistic map one of these two states must be chosen.

The present invention uses either or both of backward or forward iteration for encryption and decryption. Backward iteration of an irreversible dynamical system creates a dynamical I/O to the system which can be used for the storage and encryption of information. A reason that using backward iteration of an irreversible dynamical system in any practical application has never before been considered is that each state of an irreversible dynamical system (such as the logistic map) typically has many antecedent states. The question is then which one of these antecedent states to use. A pertinent feature of the present invention is that this choice can be made either arbitrarily, or according to information in an input information stream. If some of the choices are arbitrary, this arbitrariness leads to arbitrary details in the encoding of the message, which, if the dynamical system is mixing, will diffuse across the plaintext during encryption. This makes the work of a code-breaker not in possession of the key very difficult indeed. One who does possess the key, and hence knows the dynamical systems used to encrypt, need only apply the known dynamical systems to the ciphertext, typically operating each dynamical system forward in time wherever the dynamical system was operated backward in time during encryption, in order to recover the plaintext. The action of the dynamical system operating forward in time is to separate from the ciphertext all of the information due to the arbitrary choices which were made during backward iteration in the encryption phase.

A number of technical challenges are encountered in reduction of the method and apparatus of this invention to practice. For best results, it has been found that these challenges may be handled by imposing successive specialization on the kind of dynamical system to be used. Even when using these specializations, the final set of usable dynamical systems is infinite.

Each specialization used to arrive at the preferred embodiment is listed and defined below, along with a brief motivation for this choice. It will be understood that these are not the only choices which could be made to build an embodiment of the invention. Several alternate embodiments are presented to help highlight the full scope of the invention.

Determinism. A dynamical system is deterministic if the future state of the system is completely determined by its previous states. This specialization is preferred so that each ciphertext will decrypt to a unique plaintext. Nondeterministic, or probabilistic dynamical systems can also be used to produce decryption to unique plaintext if, for instance, the "noise" in the system is small and can be removed by error correction. Such embellishments will not be further considered here.

Irreversibility. A dynamical system is irreversible if some or all of the states of the system have more than one antecedent state. That is, some or all of the states of the system have the property that they can be produced from more than one initial condition using a given number of iterations of the system. The encryption phase of this invention calls for a choice to be made among antecedent states of a given state in order to inverse iterate the system. The specialization to irreversible dynamical systems is made so that this choice for some or all of the states is non-trivial. Reversible dynamical systems can be used for some parts of encryption, but to meed the specification of this invention, at least one of the dynamical systems used during encryption must be irreversible.

Finite States. A dynamical system has finite states if each of its variables has only a finite number of possible values. This specialization is made since for best results, the invention is embodied using digital data processors. Such processors have only a finite number of states. When the method is limited to dynamical systems with finite states, round-off-error problems are avoided. Such problems may be encountered in embodiments of this invention using dynamical systems with continuous variables, since they are computed in hardware using floating-point arithmetic.

Temporal Discreteness. A dynamical system operates in discrete time if iteration of the system produces a sequence of states which can be indexed by integers. This specialization further facilitates embodiment of the invention using digital using digital data processors.

Multiplicity of Variables. A dynamical system has multiple variables if each of its states is comprised of values of a plurality of variables. This specialization allows the invention to be embodied in a array of data processor with a parallel architecture. This simplifies the construction of the machine and allows the encryption and decryption tasks to be distributed over many processing units, potentially increasing the speed of the process.

Identity of Variables. The variables of a dynamical system with multiple variables are identical if each has the same number of possible values. This specialization further simplifies the manufacture of a parallel embodiment of the invention.

Dynamical Regularity. A dynamical system with a multiplicity of identical variables is dynamically regular if the function used to update the value of each variable is the same. This specialization further facilitates the embodiment of the invention in an array of digital data processors with parallel architecture.

Temporal Locality. A dynamical system is temporally local if the current state of the system depends on previous states of the systems which are no more than a finite distance backward in time. This specialization limits the amount of information which must be processed during each step of encryption and decryption.

Spatial Locality. A dynamical system with a multiplicity of variables is spatially local if 1) these variables may be represented as locations in a space, such as physical space, on which a distance is defined, and 2) the function which updates the value of each variable depends on the value of variables only up to a finite distance away from the given variable. This specialization further limits the amount of information which must be processed during each step of encryption and decryption.

Synchronicity. A dynamical system with a multiplicity of variables is synchronous if the values of all of its variables are updated at the same time. This specialization allows the state of each processor to be updated without waiting for other processors to operate, thus speeding execution of the processes of both encryption and decryption.

A dynamical system obeying the specializations finite states through synchronicity is called a cellular automaton.

In order to facilitate the description of the preferred embodiment as well as that of alternate embodiments 3 and 4, three additional specializations will be made on the set of cellular automata. It will be understood that these specializations have no conceptual importance in limiting the invention; they merely provide a means to clarify the description. As description below, unless otherwise noted, a cellular automaton has the following properties;

Each variable has only two states, labeled 0 and 1.
It operates on a one-dimensional array.
The cellular automaton rule used to update the value of each variable depends on the values of variable only one time step previously.

Given the above specializations, a cellular automaton, $\tau$ can be specified formally as follows. Let r be the radius of the cellular automaton rule, r gives the range of sites to the left and right of a given site whose values at time t could influence the value of the given site at time t+1. Let $s^t$ be the array of values of all of the sites in the lattice at time t, and let i index the sites. Then, $$s^{t+1}_i = \tau(s^t_{i-r} \ldots s^t_i \ldots s^t_{i+r}). \quad (1)$$

A cellular automaton, $\tau$, is often referred to by a rule number, $w(\tau)$, which is computed as:

$$w(\tau) = \sum_{i=0}^{2r} \tau(B(i))2^i,$$

where B(i) is the binary expansion of the integer i.

For more information of cellular automata, see H. Gutowitz, "Cellular Automata: Theory and Experiment" (MIT Press, 1991), which is incorporated herein by reference.

Toggle property. One further specialization on the set of dynamical systems is made to arrive at the preferred embodiment. Only cellular automata of a particular type, those which possess the toggle property will be used in the preferred embodiment. A cellular automaton is a left-toggle cellular automaton if equation (1) holds and:

$$1-s^{t+1}_i = \tau(1-s^t_{i-r}, \ldots, s^t_{i+r}). \quad (2)$$

Similarly, a cellular automaton is a right-toggle cellular automaton if equation (1) holds and:

$$1-s^{t+1}_i = \tau(s^t_{i-r}, \ldots, s^t_i, \ldots, 1-s^t_{i+r}). \quad (3)$$

These equations mean that rules are toggle rules if changing the value of the (either left or right) extreme site always changes the result of the function $\tau$. Changing the value of the extreme site thus toggles the value of the central site at the next time step. As will be seen below, this property simplifies the construction of the antecedent states of a given state. A given cellular automaton may be both a left- and a right-toggle cellular automaton. In order to further simplify the specification, only left-toggle cellular automata will be used, unless otherwise noted (both left- and right-toggle rules play a role in "assured tamper protection". Note that there are $2^{2^{2r}}$ left-toggle rules of radius r. When r=12, for instance, there are roughly $10^{5 \times 10^6}$ left-toggle rules.

As the teachings of Guan and Kari appear to be the closest art to the present invention, it is worthwhile to consider the differences in detail.

The most important difference between the teachings of Guan and Kari and the teaching of the present invention is that both of the prior-art systems relie strictly on reversible dynamical systems, teaching away from the use of irreversible dynamical systems; the present invention requires the use of irreversible dynamical systems for at least some aspects of encryption/decryption. Without the use of irreversible dynamical systems, no dynamical I/O, such as featured by this invention, is possible.

In accordance with the teaching of Guan and Kari, forward iteration of a cellular automaton is used for encryption and forward iteration of a different cellular automaton is used for decryption. In accordance with the present invention, one can use either or both backward or forward iteration of the same dynamical systems for both encryption and decryption.

Guan uses inhomogeneous cellular automata, i.e. a variant of cellular automata in which the function used to update the state of each site depends on which site is updated. The preferred embodiments of this invention use true cellular automata, i.e. cellular automata in which the rule used to update the state of a site does not depend on which site is updated. This feature is believed to be important for the simple manufacture and use of the preferred embodiment, as is emphasized below. It will be further appreciated that Guan's system requires very careful choice of the cellular automata to be used as keys, while in this system keys may be simply chosen at random. Further, in Guan's method, cellular automata are not actually used as dynamical systems, i.e. systems which produce an extended succession in time of states. During both encryption and decryption the cellular automaton keys are applied but once. In the present method in accordance with the invention, cellular automata are used as true dynamical systems, i.e., they are applied many times during both encryption and decryption.

In Guan's method, decryption requires the complicated solution of a system of polynomial equations. In the present method in its preferred embodiment decryption requires only the simple iterated application of a cellular automaton. Guan's method depends very tightly on properties of special kinds of inhomogeneous cellular automata and does not generalize to other types of dynamical systems, even to more general cellular automaton rules. The method of the present invention may be used with any dynamical system. For convenience of implementation in hardware, cellular automata are used in the preferred embodiment. Many other well-motivated choices are possible. It must also be noted that in practice Guan's system is restricted to cellular automata of small radius since the complexity of encryption/decryption increases rapidly with the radius of the rules used. Thus his system has a very small key space in practical embodiment. The present invention can use rules of any radius with negligible increase in computational cost with increasing radius. The key space used in practical embodiment can be as large as desired.

Kari's method is similar to Guan's in that, in order to build a functioning encryption/decryption apparatus, an inverse cellular automaton to a given reversible cellular automaton must be found. Kari has mathematically proved, however, that there exists no general method to find the inverse of a reversible cellular automaton. This fundamental fact severely limits the utility of reversible cellular automat for general-purpose cryptography.

The present invention removes the above-discussed drawbacks of the known systems, both practical and conceptual. In accordance with the present invention, the dynamical system is not used to generate random numbers. The secret key of the system is not the seed of a random number generator. The secret key(s) are a collection of dynamical system themselves. In a preferred embodiment, the encryption taught in this invention does indeed use random numbers, but these random numbers can come from any source, including generators which have proven randomness properties or even physical noise sources. More critically, the receiver of the message needs no information whatsoever concerning how the randomness incorporated into the message was generated in order to decrypt the ciphertext. In the known systems, by contrast, the receiver must know how to regenerate all of the random bits used in encryption, and must regenerate them before the message may be decrypted. Using the present invention the receiver needs only to apply the dynamical systems described by the secret key to the ciphertext in order to decrypt it.

This invention is strongly resistant to code-breakers and tamperers using any methods of attack, known- or chosen-plaintext, chosen-ciphertext, etc. This invention uses dynamical systems theory in an essential way; during both encryption and decryption, the dynamical system is used to operate directly on the text being processed. Almost any dynamical system can be used. It will be understood that the dynamical system need not even be chaotic. All that is required for good encryption is that the dynamical system possess a much less stringent property: "mixing." "Mixing" as used herein means that information in one part of the system communicates during the operation of the system with other parts of the system. This easily established property is sufficient to cause random information inserted during the encryption phase of the invention to diffuse across the plaintext.

DESCRIPTION OF THE PREFERRED EMBODIMENT

The method and apparatus of the preferred embodiment will now be described with reference to FIGS. 1 to 10. The preferred embodiment uses toggle cellular automata as dynamical systems for encryption and decryption. These toggle cellular automata are the secret keys used in encryption and decryption. Before secure communication can begin between two parties A and B, these parties must share a secret collection of toggle cellular automata, and some convention for selecting which of these are to be used at each step of encryption/decryption.

The key elements of the method of the preferred embodiment will be presented in terms of a concrete application in which the encryption/decryption capabilities of this invention are advantageous. Further applications, the hardware modifications they entail, and several alternate embodiments of the invention will be described further below. In the application under discussion here only one toggle automaton, of radius r, is used as a secret key. It is assumed that this is a left-toggle cellular automaton. It is further assumed that the communicating parties share an integer n which specifies the number of encryption/decryption steps.

The application involves communication between two banks, A and B. Bank A, located in the United States, wishes to securely communicate with bank B, located, for instance, in Japan. Due to their great physical separation, these banks must communicate over an insecure trans-pacific phone line via modem. As in any application, the type of information to be communicated of course influences the convention to be established between the communicating parties which governs how information is to encoded and decoded into the encryption/decryption apparatus. In this case, A and B communicate numbers representing the values of various transactions. They must, therefore, identify these numbers as representing either dollars or yen, and need certain special symbols to aid in further processing of this information. They find that a 4-bit code, as given in Table 1 suffices for their needs. In this table, a symbol, the 4-bit code for the symbol, and its meaning if non-numeric terms is indicated.

Figure 1:
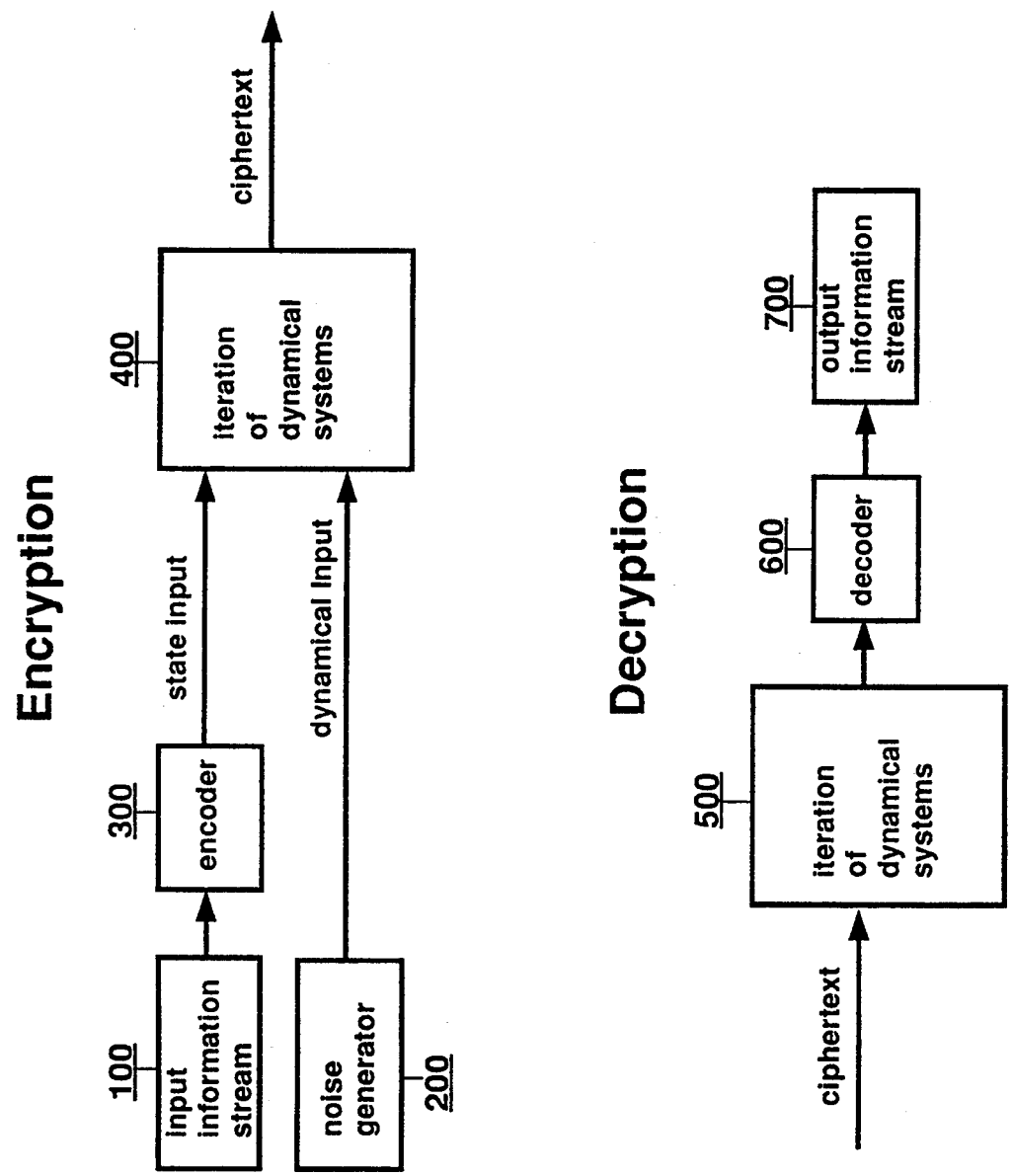
FIG. 1 is an overview of the invention.

Referring to FIG. 1, an overview of the preferred embodiment

TABLE 1

Code for symbols used in application to international bank communication.

| Symbol | Code | Meaning |
| --- | --- | --- |
| 0 | 0000 | |
| 1 | 1000 | |
| 2 | 0100 | |
| 3 | 1100 | |
| 4 | 0010 | |
| 5 | 1010 | |
| 6 | 0110 | |
| 7 | 1110 | |
| 8 | 0001 | |
| 9 | 1001 | |
| . | 0101 | decimal |
| " " | 1101 | space |
| , | 0011 | comma |
| X | 1011 | block end |
| $ | 0111 | dollar |
| Y | 1111 | yen | used in this application will now be described. The information to be encrypted is supplied from an input information stream shown at 100 generated by A. This input stream typically resides before encryption on some electronic storage medium, such as a computer storage disk. The input information stream contains banking symbols in accordance with those shown in the first column of Table 1. In accordance with the invention, A also possesses a noise generator 200 which supplies random bits of information. It will be understood that any high-quality noise source, such as, for example, the DOD standard noise source, could serve as noise generator 200. A has an encoder 300 which translates banking symbols into bit strings as specified in Table 1. The encoder 300 may be embodied as a read-only memory which contains the information in Table 1 or in other software well known to those skilled in the art. A has an encryption apparatus 400 which is able to backward iterate toggle cellular automata in iterative and/or parallel mode as described below. B has a decryption apparatus 500 which is able to forward iterate toggle cellular automata in iterative and/or parallel mode as described below. B possesses further a decoding apparatus 600 which translates bit streams into streams of banking symbols by reference to Table 1. The method in accordance with the invention in which B uses this apparatus to generate an output information stream 700 duplication A's input information stream 100 is described below.

The details of the operation of the apparatus of the preferred embodiment depend on several constants which depend in turn on the radius r of the cellular automaton used. To simplify the description, these constants will be given labels as follows: the diameter, $d=2r+1$, the rule table size $S=2^{2r+1}$, and the reduced rule table size $R=2^{2r}$.

Figure 2:
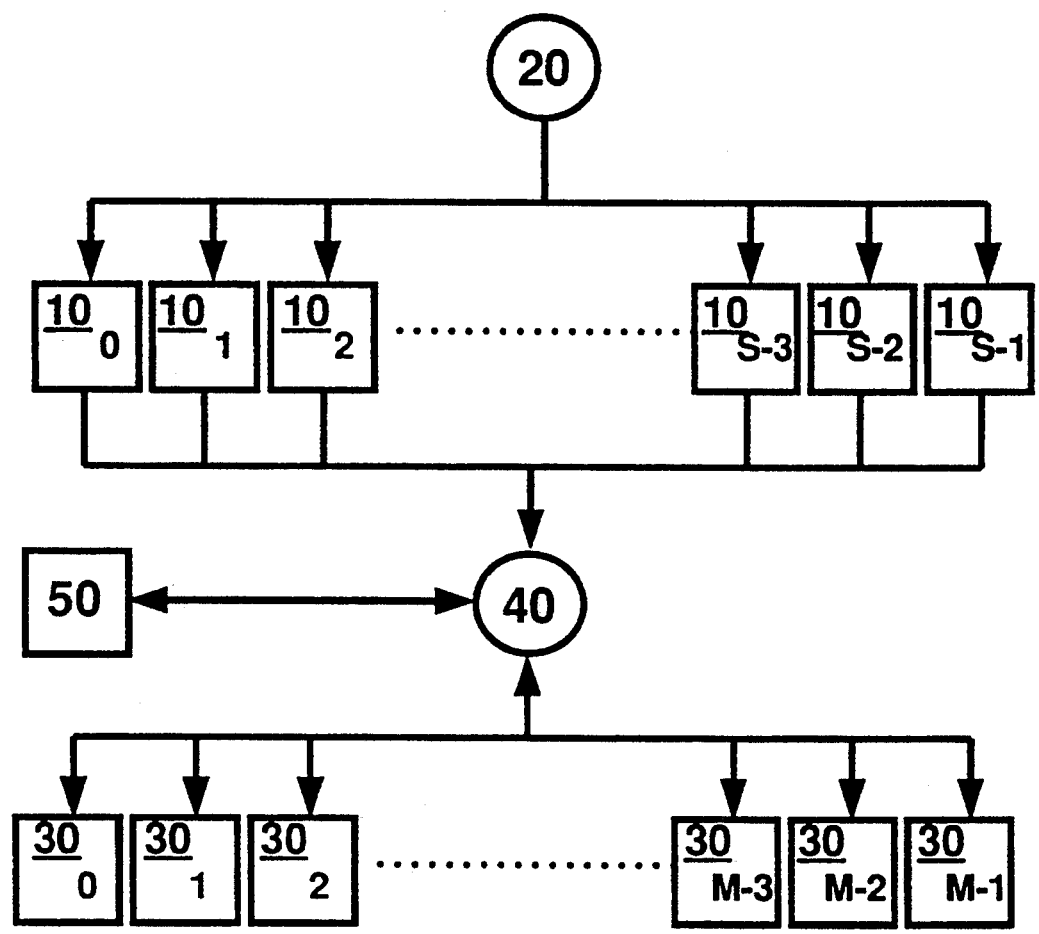
FIG. 2 is a diagram showing iterative encryption/decryption.

Referring now to FIG. 2, the apparatus of the preferred embodiment has several parts which are used in both encryption and decryption. Part 10 comprises a memory implementing a lookup table which contains the cellular automaton rule, and will thus be called the rule table. This rule table comprises an array of memory element each of which, preferably, can store 1 bit of information. The number of memory elements which must be devoted to this purpose depends on the radius of the particular rule used. If the radius is r, then there must be S memory elements in the rule table.

Data processor 20 sets the values in the rule table 10. There must be at least one such processor and it will be appreciated to those skilled in the art that, depending on hardware details, this processor could be physically identical with another processor in the system. This processor will be referred to as the rule-table setter. The rule-table setter 20 takes as input a bit b and an integer i and sets the value of two elements of the rule table accordingly. The integer i must be in the range $0<=i<R$, the reduced rule table size. The rule table setter 20 has two modes of operation, left and right. In left mode, if the bit b is 0, then the rule-table setter sets the rule-table element indexed i to 0 and sets the rule-table element indexed i+R to 1. If the bit b is 1, then the rule-table setter 20 sets the rule-table element indexed i to 1 and sets the rule-table element indexed i+R to 0. In right mode, if the bit b is 0, then the rule-table setter 20 sets the rule-table element indexed 2*i to 0 and sets the rule-table element indexed 2*i+1 to 1. If the bit b is 1, then the rule-table setter 20 sets the rule-table element indexed 2*i to 1 and sets the rule-table element indexed 2*i+1 to 0.

As an example of the operation of the rule-table setter, consider construction of the rule table for the nearest-neighbor (r=1) left-toggle cellular automaton rule 30 shown in Table 2. Since r is 1, R is 4. Invoking the rule-table setter in left mode with the bit sequence 0, 1, 1, 1 for i=0 to 3 respectively produces the rule 30. Invoking the rule-table setter in right mode with the same bit sequence produces the right-toggle rule 86. The left-toggle rule 60 which is used in some examples below is produced by the rule-table setter in left mode with the input sequence 0, 0, 1, 1. The rule tables for these three rules are shown in Table 2.

TABLE 2

Lookup tables for iteration of cellular automaton rules 30, 86, and 60, used as example keys in the preferred embodiment.

| Rule index | $x_{i-1}{}^t x_i{}^t x_{i+1}{}^t$ | 30 $x_i{}^{t+1}$ | 86 $x_i{}^{t+1}$ | 60 $x_i{}^{t+1}$ |
| --- | --- | --- | --- | --- |
| 0 | 000 | 0 | 0 | 0 |
| 1 | 001 | 1 | 1 | 0 |
| 2 | 010 | 1 | 1 | 1 |
| 3 | 011 | 1 | 0 | 1 |
| 4 | 100 | 1 | 1 | 1 |
| 5 | 101 | 0 | 0 | 1 |
| 6 | 110 | 0 | 1 | 0 |
| 7 | 111 | 0 | 0 | 0 |

As previously discussed, the rule numbers are derived from the sum of the binary expansions of the location of the 1's in the respective index position of the rule table. Thus in the examples of Table 2, in the third column $$2^4+2^3+2^2+2^1=16+8+4+2=30 \qquad \text{(Rule 30)}$$

while in the fourth column, $$2^6+2^4 2^2+2^1=64+16+4+2=86.$$

Array of memory elements 30 stores the current state and dynamical I/O, that is, the information being encrypted and decrypted. The memory elements in this array are indexed i=0, ..., M−1, and may be considered to be physically 1-dimensional. Each can store 1 bit. If the block size, number of encryption/decryption steps, and rule radius are N, n, and r respectively, then M is at least N+2nr.

Advantageously, for iterative encryption and decryption, another processor in the system 40 has associated with it a memory element 50 which can store d bits of data. This memory will be considered to contain a d-bit size integer, but could also be embodied as a shift register. Depending on the desired hardware implementation, it will be apparent to those skilled in the art that this processor 40 could also be identical to some other processor in the system. Suitably, the processor 40 performs the following operations:

Access the bits in the memory elements of the array 30 and set bits accordingly in its memory element 50.

Access the rule table 10 using information in its memory element 50, and set bits accordingly in the array of memory elements 30.

Shift, either to the left or right, the bits in its memory element 50.

The method of iterative encryption and decryption will now be described using this processor 40 and its memory element 50, though as stated previously, it will be understood that the method may be suitably carried out using other processors in the system. Alternatively, each of the memory elements in the array 30 may be associated with its own processor, each able to access only part of the memory array 30, and each updating only one element of the array 30. Use of a distinguished processor 40 permits the total number of bit operations performed during each cycle of iterative encryption and decryption to be reduced compared to the iterative process in which the tasks are distributed over an array of processors, each acting only during part of the cycle.

Use of such as array of processors will be described below in conjunction with the parallel decryption process.

ITERATIVE ENCRYPTION

Figure 3:
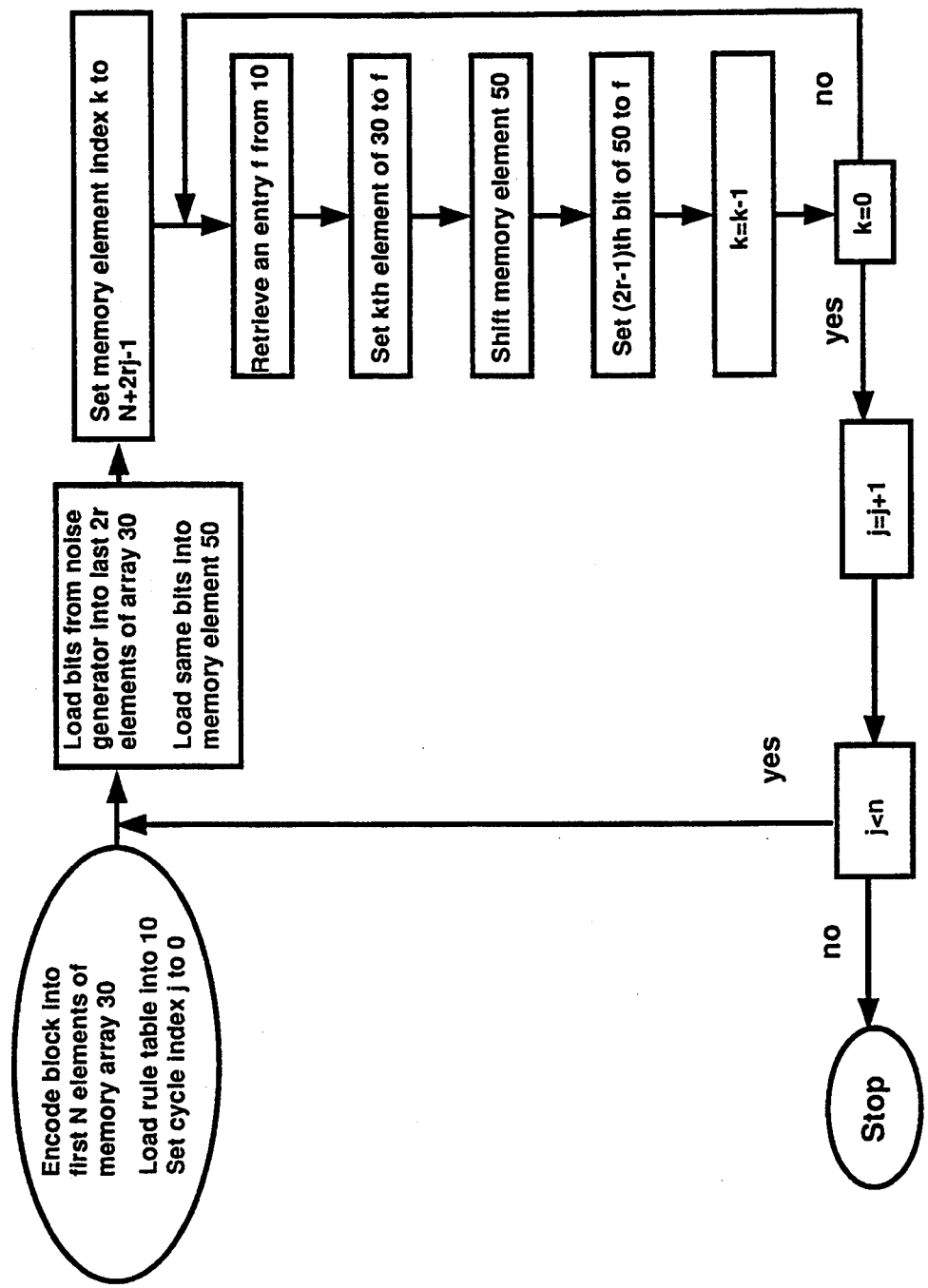
FIG. 3 is a flow chart of iterative encryption.

The iterative method and apparatus of encryption will now be described with reference to FIGS. 1 through 3.

Initialization of the system. A block of banking symbols is retrieved from the input information stream 100 by the encoder 300, which then codes these symbols by reference to Table 1 into a block of bits. If there are m symbols in the block of symbols retrieved, then the number of bits is N=4*m. These N bits are loaded in sequence into the memory array 30 by the encoder. This activates N memory elements in the array 30, these elements being indexed 0, ..., N−1.

Using the rule-table setter 20, the rule table 10 is loaded with the secret key.

Encryption. Encryption then continues over n cycles. At each cycle, the following operations are performed in sequence:

Bits from the noise generator 200 are placed in the dynamical I/O for this cycle of encryption. The dynamical I/O in this embodiment using left-toggle rules of radius r comprises the 2r memory elements of array 30 to the right of the currently active memory elements. At encryption cycle j, there are already N+2rj memory elements active, so these bits are placed in the memory elements of array 30 indexed N+2rj+i, i=0, ..., 2r−1.

The same 2r bits used to activate memory elements in the array 30 are placed in the memory element 50 of the processor 40.

The (2r−1)th -order bit of the integer in the memory 50 is set accordingly to the bit placed in the memory element of 30 indexed N+2rj and so on down to the 0th-order bit which is set according to the bit placed in the memory element 30 indexed N+2r(j+1)−1.

Beginning with the memory element 30 indexed k=N+2rj−1, and continuing down to the memory element labeled 0, the following operations are performed: An entry f in the rule table 10 is retrieved by the processor 40. Let b be the bit in the memory element 30 indexed k, and let g be the integer in the memory element 50. If b is 0, then f is the gth entry in the rule table 10, and if b is 1, then f is the (g+R)th entry in the rule table 10. The kth memory element of 30 is set to f.

The integer in 50 is shifted to the right, i.e., the (2r−1)th-bit becomes the (2r−2)th bit and so on down. The 0th-order bit is dropped.

The (2r−2)th-bit of the integer stored in memory 50 is set to f.

After n cycles of encryption, the memory elements of 30 indexed 0 to (N+2rn−1) are activated, and contain the ciphertext.

PARALLEL ENCRYPTION

Figure 4:
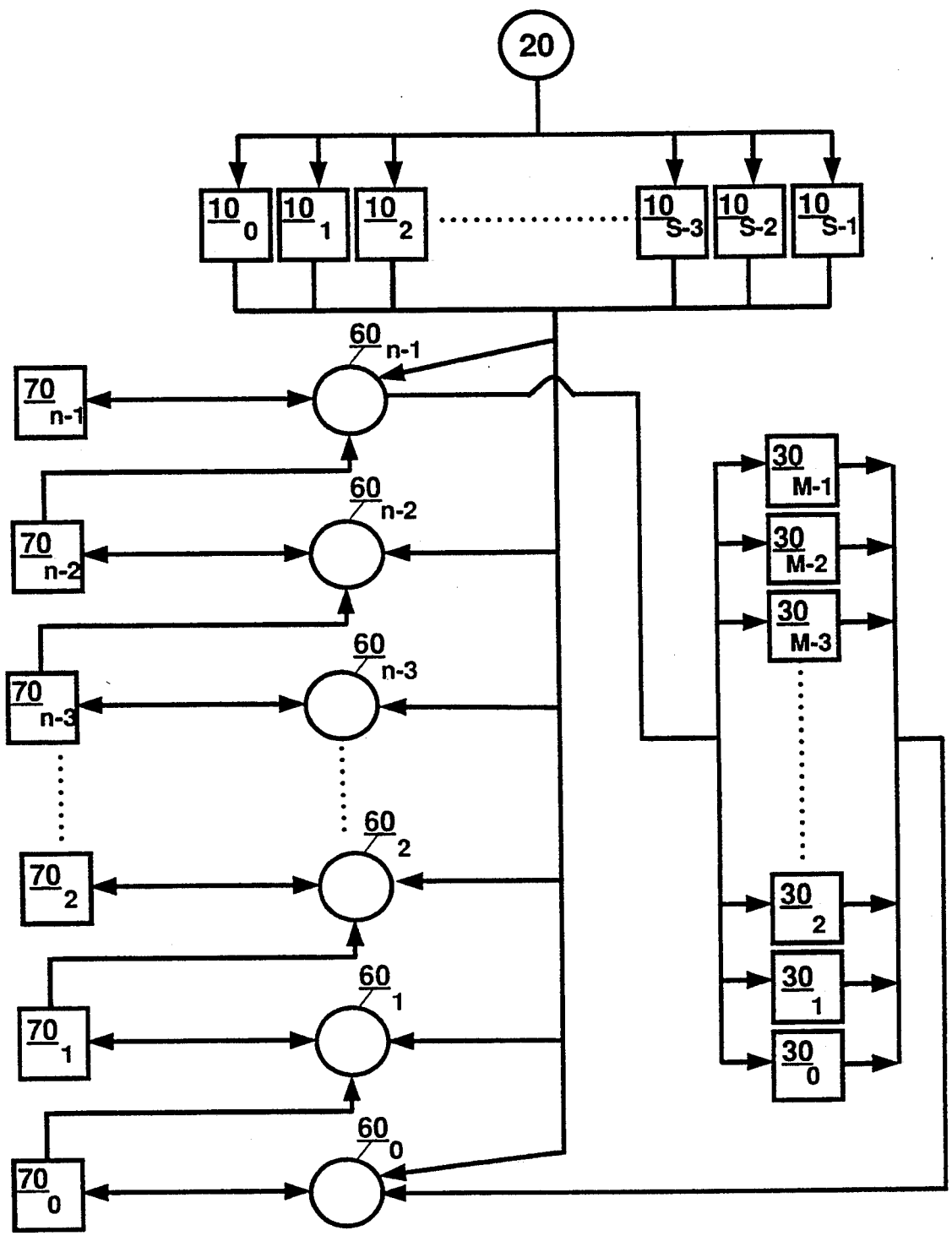
FIG. 4 is a diagram illustrating parallel encryption.
Figure 5:
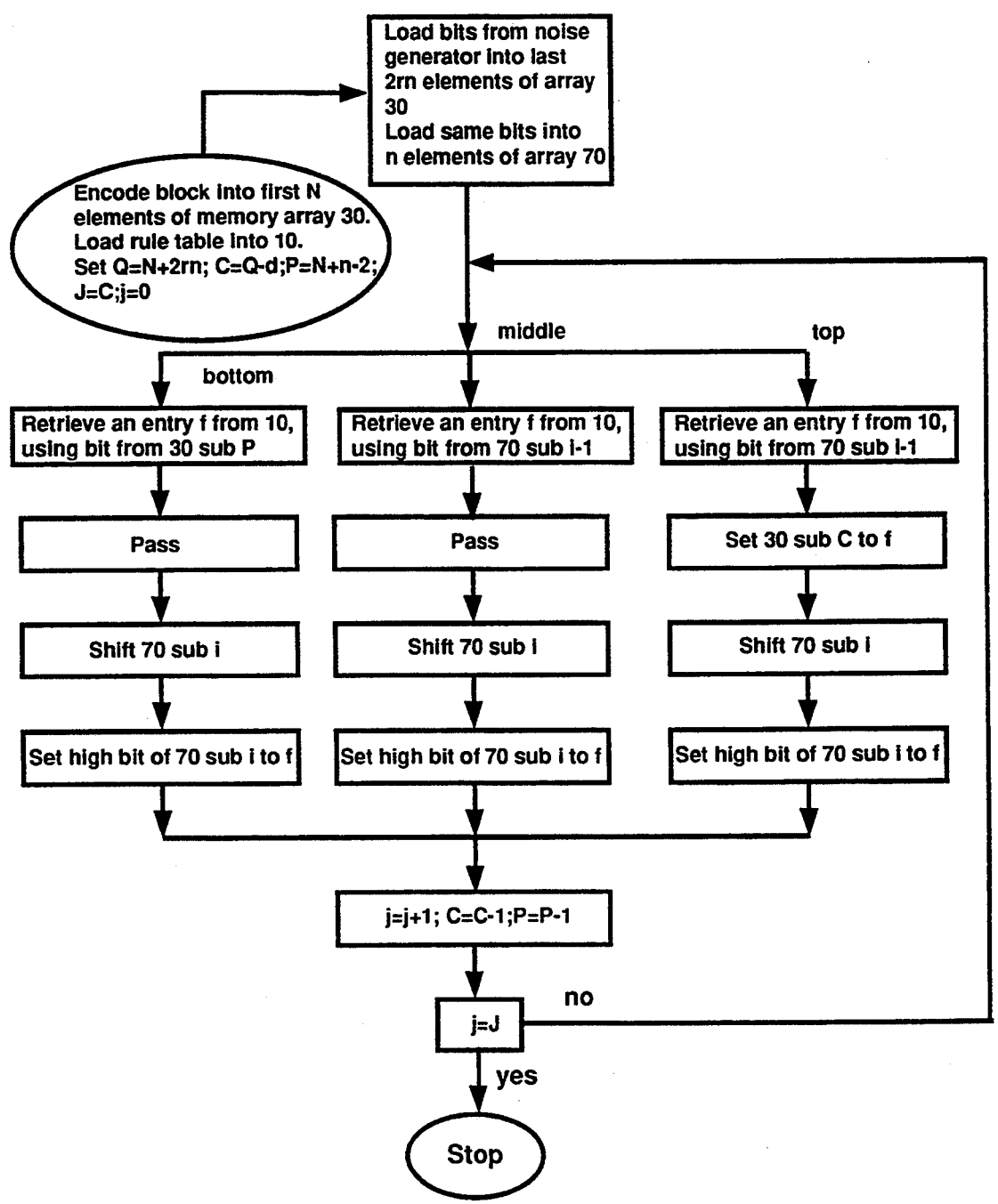
FIG. 5 is a flow chart of parallel encryption.

In each cycle of iterative encryption just described, one inverse iteration of a cellular automaton was performed. When an array of processors is used, each of which is of a type similar to the processor 40 described above, many steps of inverse iteration can be performed sat the same time in parallel. FIG. 4 shows such an array of processors 60 having associated d-bit memory elements 70. To perform n steps of parallel encryption, these arrays must contain at least n memory elements.

It will be understood that all of the processors in the array 60 can read from the rule table 10. Each can also read and write to its associated memory element in the array 70.

However, in accordance with a preferred embodiment illustrated here, only that processor in array 60 that is indexed 0 needs to be able to read from the memory array 30 which contains the information being encrypted, and only the processor in array 60 that is indexed n−1 needs to be able to write to the memory array 30. Each of the processors except the one indexed 0 can read respectively from the memory element of array 70 that is indexed 1 less than its own index number. Since the processors have slightly different I/O connections, it will be useful to give them different names. The processor indexed 0 will be called herein the bottom processor, the processor indexed n−1 will be called the top processor, and the other will be called middle processors. The operation of this processors will be explained with reference to FIG. 5.

Initialization. Initialization of the state of the memory array 30 with an N-bit string encoding the information to be encrypted proceeds in the same way as in the process for iterative encryption described above. The rule table 10 is initialized with the rule table setter 20 also as described in connection with iterative encryption. Each of the memory elements in the array 70 is initialized with random information in similar manner as the memory 50 was described as being initialized in iterative encryption. As discussed in iterative encryption, similarly random bits are also used to initialize states of memory elements in the array 30. The bits used to initialize memory element i of the memory array 70 are used also to initialize the states of memory elements 30 indexed $N+2ri ... N+2r(i+1)-1$.

Encryption. Let Q be $N+2rn$, i.e. the total number of memory elements in array 30 initialized with either information to be encrypted or random information. Indices C and P are defined with initial values $C=Q-d$ and $P=N+u-2$. A constant J is set to $Q-d$. Then, for an index j initialized to 0, the following process, in which each processor in the array 60 operates in parallel, stops when j reaches J:

The bottom processor obtains a bit b from the element of array 30 that is indexed P, provided that P is greater than or equal to 0, otherwise this bit will not be used and can be set arbitrarily to 0. Each of the middle processors indexed i, and the top processor indexed $n-1$ obtain a bit b from the 0th-order position of the integer in the element of the memory array 70 indexed $i-1$.

Using the bit b and the integer g in its associated memory element in the array 70, each of the processors in the array 60 obtains a bit f from the rule table 10. If b is 0, then f is the gth entry in the rule table 10, and if b is 1, then f is the $(g+R)$th entry in the rule table 10.

The top processor sets its bit f in the memory element of array 30 that is indexed C. The other processors remain idle during this operation.

Each of the processors in the array 60 shifts the integer in the associated memory element in array 70 to the right.

Each of the processors in the array 60 sets its bit f in the $(2r-1)$th position (the high bit) in its associated memory element in the array 70.

C and P are each decremented by 1, and j is incremented by 1.

At the end of this process, the ciphertext is in the memory array 30, in elements indexed $0 ... Q-1$.

ITERATIVE DECRYPTION

While both encryption and decryption in the preferred embodiment are best performed in parallel hardware, it is possible to perform decryption as well as encryption using a single main data processor, using similar apparatus as used in iterative encryption and as shown in FIG. 2.

Figure 6:
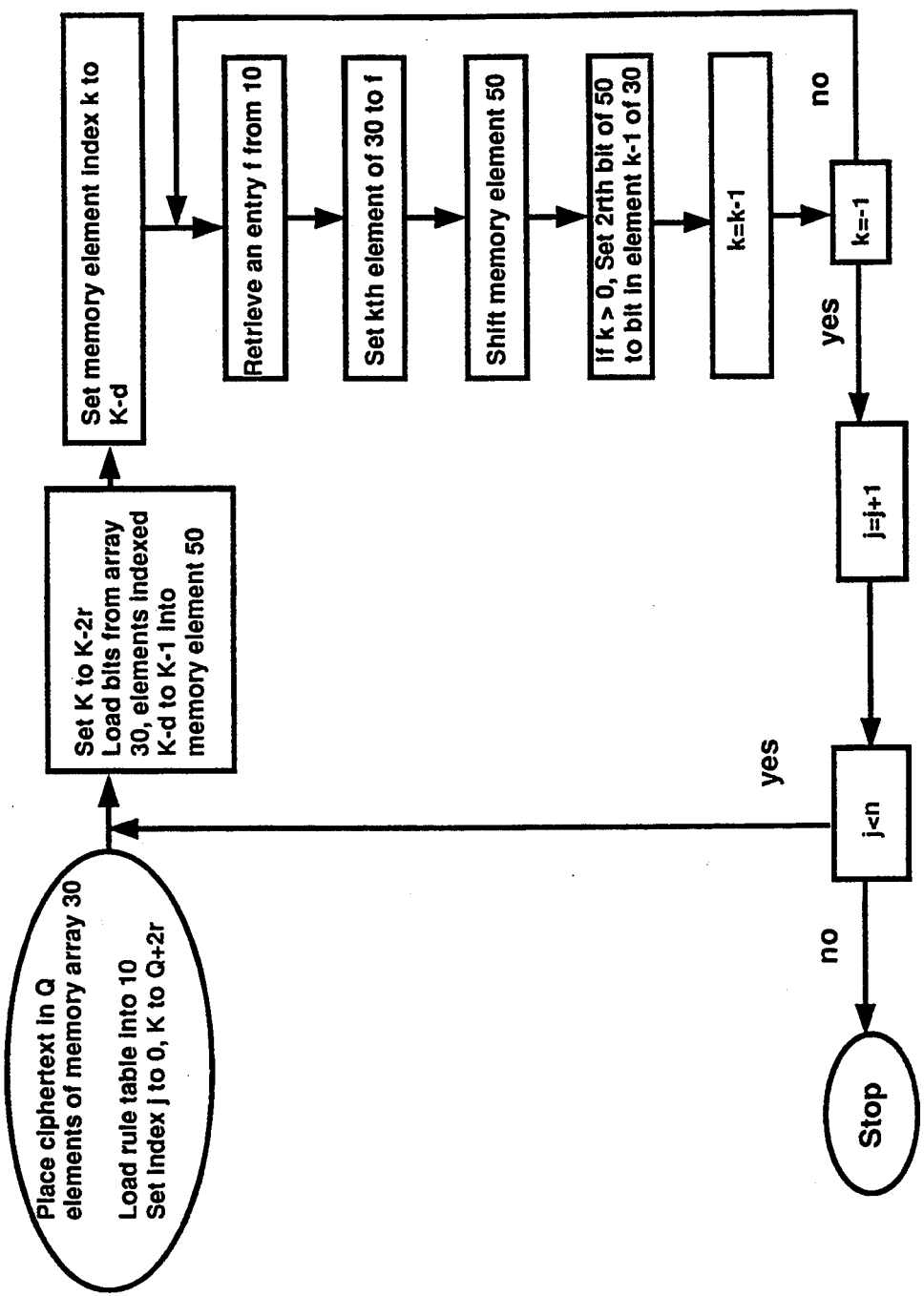
FIG. 6 is a flow chart of iterative decryption.

The operation of this apparatus in iterative decryption is explained with reference to FIG. 6.

Assume that Q bits of ciphertext have been received by a user B who wishes to decrypt them.

Initialization. The Q bits of ciphertext are used to activate the Q elements in the memory array 30 that are indexed $0 ... Q-1$. The rule table 10 is initialized with the rule table setter 20 as discussed in the method of encryption. An index K is set to $Q+2r$ and an index j is set to 0.

Decryption. Decryption continues over n cycles.

Cycle initialization. K is decremented by 2r. K marks the right boundary for the current encryption cycle. The d bits in the integer in memory element 50 are set according to the currently right-most d bits of the ciphertext. An index k is set to $K-d$.

At each cycle the following steps are performed until k is 0:

The integer, g in memory element 50 is used to index into the rule table 10, an entry f is retrieved.

The kth element of 30 is set to f.

The integer in the memory element 50 is shifted right.

The dth bit of the integer in memory element 50 is set to the bit in the memory element of array 30 indexed $k-1$.

The index number k is decremented by 1.

It will be understood that the described process forward iterates the dynamical system one step at each cycle.

At the end of all n cycles, the bits from the memory array 30 are passed to the decoder 600 (FIG. 1). The decoder 600 looks up from Table 1 the symbol corresponding to each group of 4 contiguous, non-overlapping bits. As a result of these steps, the resulting symbol stream 700 is the same as the symbols input by A.

PARALLEL DECRYPTION

Figure 7:
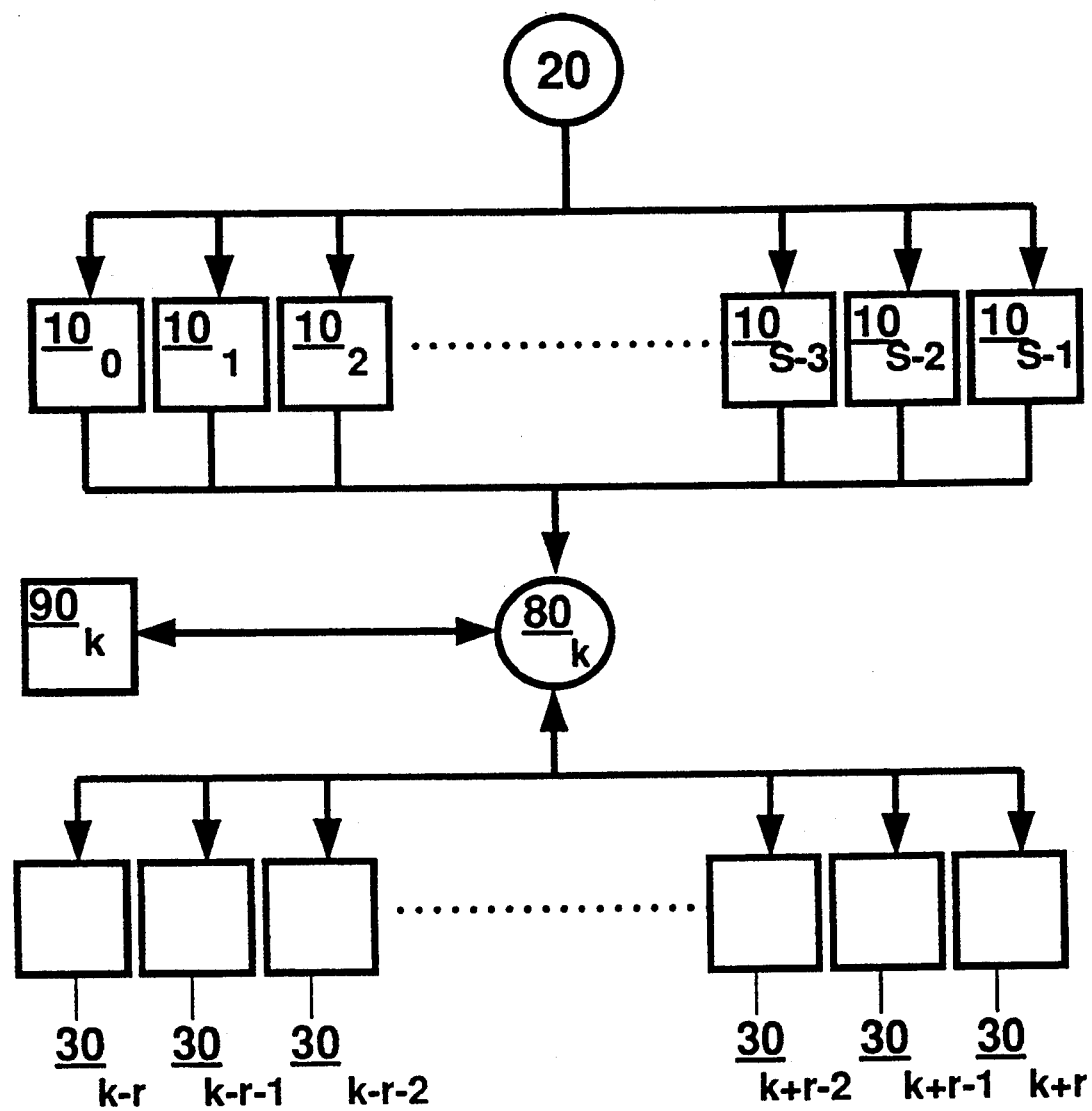
FIG. 7 is a diagram illustrating parallel decryption.
Figure 8:
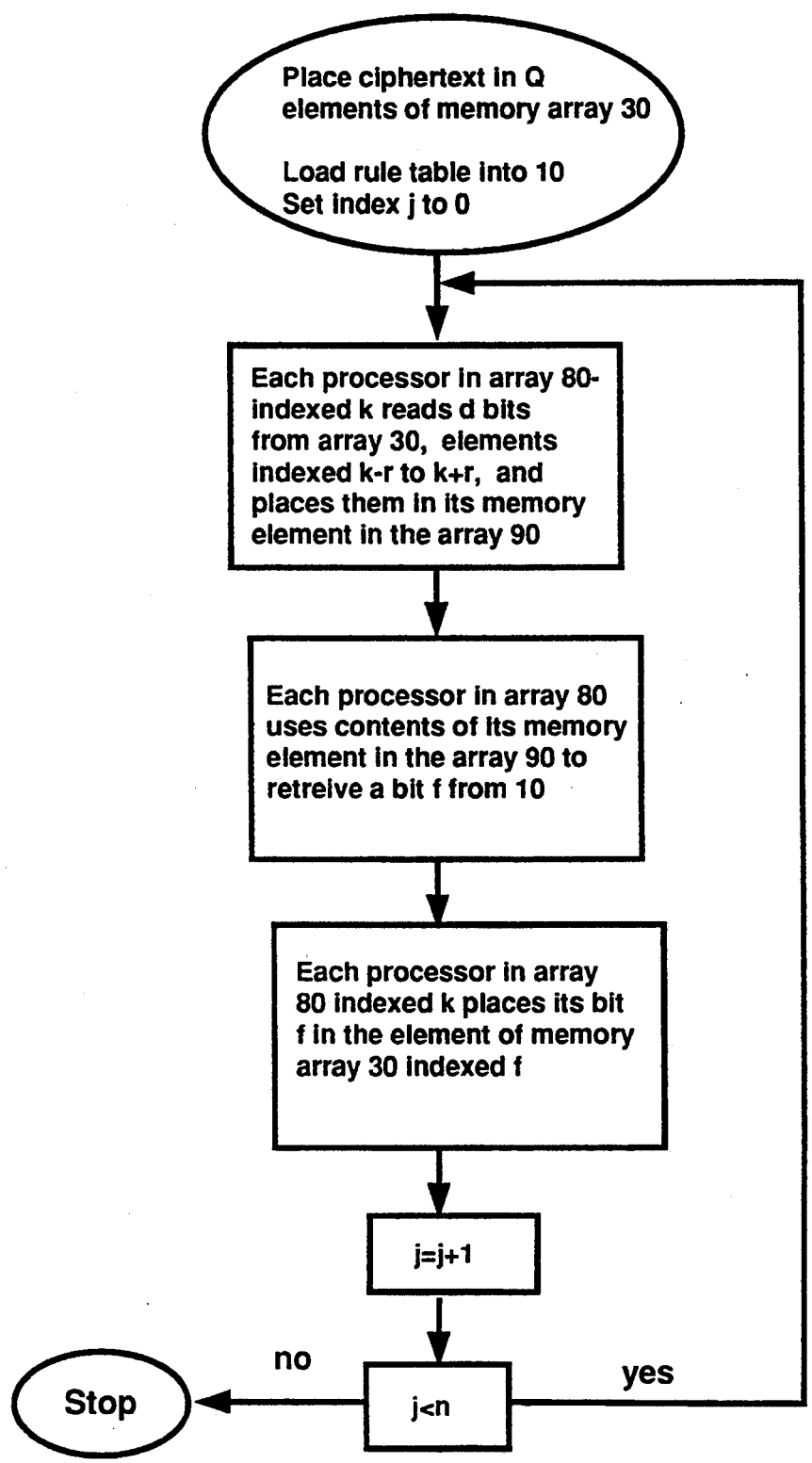
FIG. 8 is a flow chart of parallel decryption.

Parallel decryption is described with reference to FIGS. 7 and 8. The updating of each of the memory elements in the array 30 can be done in parallel using an array of processors. This array 80 contains processors each similar to the processor 40 used in iterative decryption. Each of these processors is associated with a memory element of an array 90, each of the elements of which can store d bits of information. As described above, the d bits may be considered to represent a d-bit integer. If the number of bits in the ciphertext block is Q, then the array 80 and 90 must each have at least Q elements.

While the processor 40 used in iterative decryption can read and write to any element in the array 30, a processor indexed k in the array 80 needs only to be able to read from the elements indexed $k-r ... k+r$ in the array 30. Such a processor need only to be able to write to the memory element indexed k in the array 30. The arrangement of I/O connections of the processors in the array 80 is shown in FIG. 7. In order to avoid indexing problems near the end of the arrays, these array can be considered to have periodic boundary conditions, i.e., the element indexed Q is identified with the element indexed 0.

Initialization. The memory array 30 is activated with Q bits of ciphertext just as described above. The rule table 10 is initialized with the rule table setter 20 as described in the steps for encryption.

Decryption. Over n cycles each of the processors in array 80 performs the following operations:

Each processor indexed k reads d bits from the memory array 30 at positions indexed $k-r ... k+r$, and stores these bits as an integer g in its associated memory in the array 90.

Each processor retrieves the bit b at index g in the rule table 10.

Each processor indexed k sets the memory element that is indexed k in array 30 to b.

After n cycles the contents of array 30 are sent to the decoder 600 as in iterative decryption.

BANKING EXAMPLE

Tables 3 and 4 show the encryption and decryption of an example message using the apparatus described above. In this example a simple message, for example "Y146,00", is sent from A to B. A and B share as a secret key, the radius-1 left-toggle rule known as rule 30, whose rule table is given in the third column of Table 2. It is considered public knowledge that banks use 14 steps of encryption/decryption for their communication.

Tables 3 and 4 show the steps of encryption/decryption in two different formats. In Table 3 the state of the memory array 30 at the end of each cycle of encryption/decryption is shown coded according to Table 1. This representation allows for easy global visualization of the steps of the process. In Table 4 the same steps of encryption/decryption are shown in a raw format, i.e. the actual states of the elements in the array 30 are shown. This representation allows detailed verification of the steps performed.

TABLE 3

Encryption and Decryption of an example message between banks A and B. In this table the state of the processor array at each step of encryption/decryption is treated by the decoder 600 to allow for easy visualization. The plaintext, Y146, appears at line 0 of the encryption table and line 14 of the decryption table. The ciphertext, 8X.0X021.66$X, appears at line 14 of the encryption table, and line 0 of the decryption table.

| Rule Encrypt | Step | I/O | Rule Decrypt | Step | I/O |
|---|---|---|---|---|---|
| 30 | 0 | Y146.00 | 30 | 0 | 8X.0X021.66$X |
| 30 | 1 | 4$785YY1 | 30 | 1 | 62X,.8Y95XX12, |
| 30 | 2 | 7840.94$ | 30 | 2 | XY.3X607.2293 |
| 30 | 3 | 97 Y36788 | 30 | 3 | 205$25,,5 Y7$ |
| 30 | 4 | $4,428977 | 30 | 4 | 3,$1Y6 3.40, |
| 30 | 5 | 370 306996 | 30 | 5 | 231X094.X703 |
| 30 | 6 | .9Y22081$8 | 30 | 6 | Y$X.,YY524, |
| 30 | 7 | 012X300$373 | 30 | 7 | 012X300$373 |
| 30 | 8 | Y$X.,YY524, | 30 | 8 | ,9Y22081$8 |
| 30 | 9 | 231X094.X703 | 30 | 9 | 370 306996 |
| 30 | 10 | 3,$1Y6 3.40, | 30 | 10 | $4,428977 |

TABLE 3-continued

Encryption and Decryption of an example message between banks A and B. In this table the state of the processor array at each step of encryption/decryption is treated by the decoder 600 to allow for easy visualization. The plaintext, Y146, appears at line 0 of the encryption table and line 14 of the decryption table. The ciphertext, 8X.0X021.66$X, appears at line 14 of the encryption table, and line 0 of the decryption table.

| Rule Encrypt | Step | I/O | Rule Decrypt | Step | I/O |
|---|---|---|---|---|---|
| 30 | 11 | 205$25,,5 Y7$ | 30 | 11 | 97 Y36788 |
| 30 | 12 | XY.3X607.2293 | 30 | 12 | 7840.94$ |
| 30 | 13 | 62X,.8Y95XX12, | 30 | 13 | 4$785YY1 |
|  | 14 | 8X.0X021.66$X |  | 14 | Y146.00 |

A variant of the raw display format allows the resistance of the invention to cryptanalytic attack to be easily verified. In this variant, two very similar runs of encryption are performed, and an XOR of the state of the memory array in the two cases is displayed. The XOR is 1 if and only if values in the corresponding positions in the two runs differ. For clarity 1 is represented by the symbol "#" and 0 is represented by the symbol "—". In Table 5, the decryption phase of Tables 3 and 4 is XOR'ed with a decryption process using the same sequence of random bits in the dynamical input, but on a ciphertext which differs by 1 bit from the ciphertext of Tables 3 and 4. Note that the single error propagates as decryption proceeds. If a sufficient number of encryption/decryption steps are used, then the single error will diffuse across the entire plaintext.

TABLE 4

This table shows the same steps of encryption/decryption as table 3. Here, however, the actual state of the processor array is shown. The plaintext is to be read left to right in groups of 4 bits, i.e. 1111 = 'Y', 1000 = '1', ... 0000 = '0'. The right-most two entries in each line are the dynamical I/O.

| Rule Encrypt | Step | I/O |
|---|---|---|
| 30 | 0 | 1111100000100110010100000000010 |
| 30 | 1 | 0010011111100001101011111111000 |
| 30 | 2 | 1110000100100000010110010010011101 |
| 30 | 3 | 10011110110111111100011011100001000 |
| 30 | 4 | 01110010001100100100000110011101111010 |
| 30 | 5 | 11001110000011011100000001101001100101110 |
| 30 | 6 | 0011100111110100010000000001100001111000101 |
| 30 | 7 | 00001000010010111100000000000111110011101100 |
| 30 | 8 | 111101111011010100111111111110100100001001101 |
| 30 | 9 | 01001100100010110001001001001011011111000001100 |
| 30 | 10 | 11000011011110001111011011011100010010000000001110 |
| 30 | 11 | 0100000101001110100010001100111010110111111110011 |
| 30 | 12 | 1011111101011100101101100000111001010010010011110011 |
| 30 | 13 | 011001001011001101010001111110011010101110111000010000011 |
|  | 14 | 0001101101010000101100000100100010101100110011110111110100 |

| Rule Decrypt | Step | I/O |
|---|---|---|
| 30 | 0 | 000110110101000010110000010010000101011001100111101111010100 |
| 30 | 1 | 0110010010110011010100011111100110101011011110000100011 |
| 30 | 2 | 1011111101011100101101100000111001010010010011110011 |
| 30 | 3 | 01000000101001110100010001100111010110111111110011 |
| 30 | 4 | 11000011011110001111011011011100010010000000001110 |
| 30 | 5 | 01001100100010110001001001001011011111000001100 |
| 30 | 6 | 111101111011010100111111111110100100001001101 |
| 30 | 7 | 00001000010010111100000000000111110011101100 |
| 30 | 8 | 0011100111110100010000000001100001111000101 |
| 30 | 9 | 11001110000011011100000001101001100101110 |
| 30 | 10 | 01110010001100100100000110011101111010 |
| 30 | 11 | 10011110110111111100011011100001000 |
| 30 | 12 | 1110000100100000010110010010011101 |
| 30 | 13 | 0010011111100001101011111111000 |
|  | 14 | 1111100000100110010100000000010 |

TABLE 5

Propagation of a single error introduced into the ciphertext.
"-" = site same as with no error "#" = site differs with error.

| Rule Decrypt | Step | I/O |
|---|---|---|
| 30 | 0 | ------------------#------------------ |
| 30 | 1 | ----------------###---------------- |
| 30 | 2 | ---------------#-#----------------- |
| 30 | 3 | ---------------####-#-------------- |
| 30 | 4 | -------------#-#####--------------- |
| 30 | 5 | ------------#-###-##--------------- |
| 30 | 6 | ------------#---#####-------------- |
| 30 | 7 | -----------#-#---#----------------- |
| 30 | 8 | ---------######-#-#---------------- |
| 30 | 9 | -------------#----##-###----------- |
| 30 | 10 | ------------##--####-#-#----------- |
| 30 | 11 | ----------#-#-###--#-#------------- |
| 30 | 12 | ---------#-#-#####---#-##---------- |
| 30 | 13 | --------##-#-#-#-#-####------------ |
| 30 | 14 | --------##-#-##-#-#-##---#--------- |

Table 6 is similar to Table 5, though here encryption is shown in which a single error has been introduced into the plaintext. Note that this error propagates across the ciphertext, albeit only to the left. Means to assure that errors propagate in both directions are discussed below.

Table 7 shows the difference produced when the encryption of Tables 3 and 4 is performed on the same text with the same sequence of random numbers, but with a left-toggle cellular automaton rule which differs by one bit from that used in Tables 3 and 4. This rule is known as rule 60 (table 2, column 5). Note that this minimal difference between keys produces differences throughout the ciphertext produced.

TABLE 6

Propagation of a single error introduced into the plantext.
"-" = site same as with no error "#" = site differs with error.

| Rule Encrypt | Step | I/O |
|---|---|---|
| 30 | 0 | ----------------#---------- |
| 30 | 1 | ---------------###-#-------- |
| 30 | 2 | --###-##-##--##-------- |
| 30 | 3 | ##-##-##--####---------- |
| 30 | 4 | ##--###-###-#------------ |
| 30 | 5 | #-###-##-##-##-#----------- |
| 30 | 6 | #-#-####-#-##-------------- |
| 30 | 7 | -#-#---####-##--------------- |
| 30 | 8 | -#-#######-#-##-------------- |
| 30 | 9 | ---#-#-#-#-#-## --------------- |

TABLE 6-continued

Propagation of a single error introduced into the plantext.
"-" = site same as with no error "#" = site differs with error.

| Rule Encrypt | Step | I/O |
|---|---|---|
| 30 | 10 | ----#--#---#-#------------- |
| 30 | 11 | -####-#-###-#-#------------- |
| 30 | 12 | -#-##-#-#-####------------- |
| 30 | 13 | ##########---###------------ |
| 30 | 14 | -###--###-----#------------- |

Note that if r is the radius of the rules used, the size of the rule table is $2^{2r+1}$, the number of bits required to indexed into the rule table is $2r+1$, and the number of different number toggle rules (both left and right) is $2^{2^{2r}+1}$. For clarity, the example encryptions using the preferred embodiment are done using radius 1 rules. It will be understood that in practical situations, radius 1 rules would not be used. There are only 32 radius 1 toggle rules. A code-breaker could easily try them all and hence decrypt the message by brute force. The situation at radius 2 is somewhat better; there are 131,072 radius 2 toggle rules. Still, especially since decryption with this invention is extremely fast, this number of rules could be searched rapidly in a brute-force attack. If self-synchronized key streams are used, so that keys are changed after each block encrypted, radius-2 rules may provided an acceptable

TABLE 7

Difference pattern: encryption under rules 30 and 60, which are only 1-bit different from each other. The 1-bit error in the rule produces random changes throughout the ciphertext

| Rule Encrypt | Step | I/O |
|---|---|---|
|  | 0 | ------------------------------------ |
| 30, 60 | 1 | -###--------###-############- |
| 30, 60 | 2 | -#-##---######-#-#-#-#-#-#-- |
| 30, 60 | 3 | -#-#-####-#-#---##-##-###----##-- |
| 30, 60 | 4 | ---##-##--#----#--#--##-####-#-### |
| 30, 60 | 5 | ---#-##-######-####-----##-#-######-#- |
| 30, 60 | 6 | #---###-#-##-##-#-#------##----#-#-#-- |
| 30, 60 | 7 | #-##-#-##-#---#-##---------#####-#-#-### |
| 30, 60 | 8 | -####-###----##-##-#########-#-#-###-#-- |
| 30, 60 | 9 | ##-#-#-##-#-###-#-#-#-##-###--#-#-###- |
| 30, 60 | 10 | -#-------##-##-###--##-##-###---#-#-----##--#--- |
| 30, 60 | 11 | ##-----##-###-#-#---#-###--##---#-#-####-####-#### |
| 30, 60 | 12 | ##-------#-#-#-#-#-##-##-##-##-------##-#-#-##-##- |
| 30, 60 | 13 | #-##---##-#####-#-#-##-#--##-#-##-###---##---##-#--- |
| 30, 60 | 14 | #-#-#---#-#-#-----##-######--#####-##-######----#-##-###- | level of security. At radius 3, there are approximately $4*10^{19}$ toggle rules, which should be enough for most applications. At radius 3, the number of keys is already 512 times greater than the number of keys in used the Data Encryption Standard.

In general, one would like a radius as large as possible given hardware limitations. There are two main hardware factors which could limit the radius of the rules used 1) address space size limitations connected with the number of bits each integer memory holds, and 2) memory size limitations connected with the memory required to hold the rule table.

Address Space will be considered first. A 16-bit processor such as used in personal computers has sufficient address space to use radius 7 rules, of which there are $2^{2^{14}+1}$, roughly $10^{5000}$. A 32-bit processor, such as used workstations and some personal computers has sufficient address space to use radius 15 rules, of which there are $2^{2^{30}+1}$.

As to memory size, in most situations, memory size, rather than address space is the most serious potential limitation. A standard 4-megabyte memory chip (such as those made by the Intel Corporation, for instance) holds $2^{25}$ bits of information, and could thus hold the rule table for a radius-12 rule. As there are $2^{224+1}$ radius-12 rules, this should be much more than sufficient for most applications. Still larger radius rules could be handled with an array of memory chips to hold the rule table.

To obtain an idea of how large rule tables used in actual practice might be, consider that if the rule table for a radius-12 rule were to be written down on paper it would occupy over 4000 printed pages (assuming 8 bits/character, 256 characters/page). By contrast, a 56-bit key such as used in the DES, for instance, would occupy 7 characters under the same circumstances.

ALTERNATE EMBODIMENTS

In this subsection four alternate embodiments of this invention are described in detail. These alternate embodiments are constructed to illustrate some general features of the invention. They are in particular designed to show that the sequence of specializations used to arrive at the preferred embodiment are not necessary to build an encryption apparatus embodying this invention.

ALTERNATE EMBODIMENT 1

The first alternate embodiment uses the logistic map as the underlying dynamical system. The cryptographic key in the embodiment comprises the parameter value of the logistic map, and the number of times n the map is applied during encryption and decryption. In this embodiment encryption involves only inverse iteration, and decryption involves both forward and inverse iteration of the dynamical system. This embodiment shows how the method of the invention can be used for encryption using dynamical systems with continuous variables. It also shows that a single such variable is sufficient to build a working encryption apparatus.

A standard form for the logistic map defines the next state $x^{t+1}$ of the system in terms of its previous state $x^t$ by $x^{t+1} = 4\lambda x^t(1-x^t)$. Here x and $\lambda$ are real numbers between 0 and 1. There are in general two antecedent states $x^{t-1}$ for each state $x^t$, these are given by $$x^{t-1} = \frac{1 \pm \sqrt{1 - \frac{x^t}{\lambda}}}{2}.$$

An example of encryption and decryption using the logistic map is shown in Table 8. To encrypt a piece of the input information stream, the piece is encoded as a state of the system, $x^0$. In the example of Table 8, the part of the information stream to be encoded in the state I/O of the dynamical system is a stream of numbers, representing, say, the amount of money in certain accounts which bank A would like to communicate to bank B. The representation of each piece of the input information stream as a state of the system used in this case is particularly simple. Each digit of the message is placed in the first position to the right of the decimal point of the state, and all other positions set to 0. Alternately, the other positions could be filled with random numbers or some other parts of the input information stream. In the example of Table 8, a single digit "8" is encrypted. During encryption of this state, a sequence of states are generated by iterating backward. At each inverse step, either $x^{t-1}_+$ or $x^{t-1}_-$ is chosen according to information from some portion of the input information stream, this portion could, for instance, contain purely random information. The choice of one of the two antecedent states places information in the dynamical I/O of the dynamical system. In Table 8 choice of $x^{t-1}_+$ represents a 0 bit in the dynamical I/O, and choice of $x^{t-1}_-$ represents a 1 bit in the dynamical I/O. Three runs of encryption are shown. In each run 12 encryption steps are carried out. In each of the three runs the state I/O is the same, but the dynamical I/O is different in each run since it is generated randomly, except for steps 6–8, at which identification information is inserted into the dynamical I/O. Thus each run produces a different ciphertext, as shown at step 12 of the encryption.

The receiver of the ciphertext can decrypt the information in the state I/O by applying the logistic map forward in time 12 steps, using the secret key he shares with the sender. The portion of the information stream placed in the state I/O by the sender is recovered from the first digit after the decimal point. To recover the portion of the information stream place in the dynamical I/O by the sender, the receiver uses inverse iteration. At each forward iteration, the receiver computes a state $x^{t+1}$ from a state $x^t$. By inverse iteration, the receiver calculates the two possible antecedent states of $x^{t+1}$ and compares each with $x^t$. If the "−" antecedent state equals $x^t$ then the receiver knows that a 1 bit was placed in the dynamical I/O by the sender, and if the "+" antecedent state equals $x^t$ then the receiver knows that a 0 bit was placed in the dynamical I/O by the sender.

In the example of Table 8, the identification information "101" is placed in the dynamical I/O at steps 6–8 of encryption. This identification information could, for instance, give the number of the block being encrypted, to be used during checks for transmission errors. The recovery of both state and dynamical I/O by the receiver of a message encrypted under alternate embodiment 1 is shown in the bottom half of Table 8.

TABLE 8

Three runs of encryption/decryption with alternate embodiment 1. λ: 1.0.
Encryption. Initialized with plaintext for all runs: 8, encoded as 0.8; The state at iteration 12 is the ciphertext. Identification information: 101 is placed in the dynamical I/O at steps 6–8. Decryption. Initialized with ciphertext at step 0. The plaintext "8" is decoded from the state I/O at iteration 12, from the first digit after the decimal point. The identification information 101 is read from the dynamical I/O at steps 7–5.

| Encrypt Step | Run 1 Dynam | State | Run 2 Dynam | State | Run 3 Dynam | State |
| --- | --- | --- | --- | --- | --- | --- |
| 0 | | 0.8000000000 | | 0.8000000000 | | 0.8000000000 |
| 1 | 1 | 0.2763932023 | 1 | 0.2763932023 | 1 | 0.2763932023 |
| 2 | 0 | 0.9253254042 | 0 | 0.9253254042 | 1 | 0.0746745958 |

TABLE 8-continued

| | | | | | | |
|---|---|---|---|---|---|---|
| 3 | 1 | 0.3633667355 | 1 | 0.3633667355 | 1 | 0.0190308211 |
| 4 | 0 | 0.8989465078 | 1 | 0.1010534922 | 1 | 0.0047805590 |
| 5 | 1 | 0.3410554404 | 1 | 0.0259360518 | 0 | 0.9988034285 |
| 6 | 1 | 0.0941229990 | 1 | 0.0065266096 | 1 | 0.4827042524 |
| 7 | 0 | 0.9758878547 | 0 | 0.9983656766 | 0 | 0.8596163746 |
| 8 | 1 | 0.4223595703 | 1 | 0.4797866170 | 1 | 0.3126609855 |
| 9 | 1 | 0.1199867010 | 0 | 0.8606290972 | 1 | 0.0854704430 |
| 10 | 0 | 0.9690451202 | 1 | 0.3133379372 | 0 | 0.9781551937 |
| 11 | 1 | 0.4120300054 | 0 | 0.9143253742 | 0 | 0.5738999430 |
| 12 | 1 | 0.1166039924 | 0 | 0.6463511409 | 1 | 0.1736182998 |

| Decrypt Step | Run 1 Dynam | State | Run 2 Dynam | State | Run 3 Dynam | State |
|---|---|---|---|---|---|---|
| 0 | 0 | 0.1166039924 | 0 | 0.6463511409 | 0 | 0.1736182998 |
| 1 | 1 | 0.4120300054 | 0 | 0.9143253742 | 1 | 0.5738999430 |
| 2 | 1 | 0.9690451202 | 0 | 0.3133379372 | 0 | 0.9781551937 |
| 3 | 0 | 0.1199867010 | 1 | 0.8606290972 | 0 | 0.0854704430 |
| 4 | 1 | 0.4223595703 | 0 | 0.4797866170 | 1 | 0.3126609855 |
| 5 | 1 | 0.9758878547 | 1 | 0.9983656766 | 1 | 0.8596163746 |
| 6 | 0 | 0.0941229990 | 0 | 0.0065266096 | 0 | 0.4827042524 |
| 7 | 1 | 0.3410554404 | 1 | 0.0259360518 | 1 | 0.9988034285 |
| 8 | 1 | 0.8989465078 | 1 | 0.1010534922 | 0 | 0.0047805590 |
| 9 | 0 | 0.3633667355 | 1 | 0.3633667355 | 1 | 0.0190308211 |
| 10 | 1 | 0.9253254042 | 1 | 0.9253254042 | 1 | 0.0746745958 |
| 11 | 0 | 0.2763932022 | 0 | 0.2763932022 | 1 | 0.2763932022 |
| 12 | 1 | 0.8000000000 | 1 | 0.8000000000 | 1 | 0.8000000000 |

Alternate Embodiment 2

The preferred embodiment uses dynamical systems with a multiplicity of variables in which the dynamical rule governing the state of each variable is the same and is local in space. This is an embodiment with a dynamical system with a multiplicity of variables in which the connections between the variables are not local and many vary depending on not only on which variable is considered, but also on which step of encryption/decryption is being performed. This embodiment demonstrates that reversible dynamical systems can be used in addition to irreversible systems to encrypt and decrypt according to this invention. In this embodiment, one of the dynamical systems is chosen to be irreversible, the others are reversible. The irreversible system is simply the logistic map of alternate embodiment 1. At each step of encryption/decryption the state of this irreversible dynamical system is globally broadcast to the other dynamical systems. This embodiment thus demonstrates that the connections between variables in a mult-variate dynamical system need not be local in order to embody this invention. Note that the reversible systems do not have a dynamical I/O. Nonetheless, they can participate usefully in encryption since changing interconnections between them, driven by the dynamical I/O of the irreversible dynamical system, serves to diffuse the information in the states of each of them into the states of the others. This embodiment demonstrates further that asynchronous updating can be used to perform encryption/decryption with this invention. Here, at each step, the state of the irreversible dynamical system is updated first, and then the state of the reversible dynamical systems are updated.

Table 9 shows the operation of an example of alternate embodiment 2. In this example three simple reversible dynamical systems are connected to the irreversible logistic map. Thus there are 4 variables, $v_0 \ldots v_3$. The secret key of the system is a set of four real numbers $\lambda_0 \ldots \lambda_3$. The value of $v_0$ is updated using the logistic map $v^{t+1}_0 = 4\lambda_0 v^t_0(1-v^t_0)$. The states of the other variables $v_i$ are a function of the value of $v_0$ and one of the other variables $v^j$ bu the funcaiton $v^{t+1}_i = 4\lambda_i v^t_j(1-v^t_o)$. The pairs $\{i,j\}$ are chosen such that the state of each variable at time t contributes to the calculation of one and only one variable in the set $v_1 \ldots v_3$. These other systems are reversible since given $v^t_0$, which is independently calculated, the antecedent state $v^t_j$ is given uniquely in terms of the state at time t+1 of the system, $$v^t_j = \frac{v^{t+1}_i}{4\lambda_i(1-v^t_0)}.$$

The value of each of the variables $v_i$ at time t+1 depends on the value of 1) the value the variable $v_0$ at time t, and the value of one other variable at time t. Which other variable $v_i$ depends on may be allowed to vary according to the dynamical I/O to $v_0$. In the example of Table 9, if a 0 is in the dynamical input of $v_0$ at time t, then the following relations are used to update the values of $v_1 \ldots v_3$:

$$v^{t+1}_1 = 4\lambda_1 v^t_2(1-v^t_0) \quad (4)$$

$$v^{t+1}_2 = 4\lambda_2 v^t_3(1-v^t_0) \quad (5)$$

$$v^{t+1}_3 = 4\lambda_3 v^t_1(1-v^t_0) \quad (6)$$

while if a 1 is in the dynamical I/O of $v_0$ at time t, then the following alternate relations are used:

$$v^{t+1}_1 = 4\lambda_1 v^t_3(1-v^t_0) \quad (7)$$

$$v^{t+1}_2 = 4\lambda_2 v^t_1(1-v^t_0) \quad (8)$$

$$v^{t+1}_3 = 4\lambda_3 v^t_2(1-v^t_0) \quad (9)$$

Encryption and decryption with this embodiment is shown in table 9. There the key values are, $\lambda_0$: 1.0, $\lambda_1$: 0.9722222, $\lambda_2$: 0.73916483275, $\lambda_3$: 0.9462346.

The plaintext is 6123, encoded as: 0.6, 0.1, 0.2, 0.3. The ciphertext is: 0.6646249811, 0.4047112390, 1.0084771899, 2.0443172127, and the number of encryption/decryption steps is 12. The dynamical I/O to $v_0$ is recovered during decryption using inverse iteration as in alternate embodiment 1.

TABLE 9

Encryption/Decryption with alternate embodiment 2. $\lambda$ values: $\lambda_0$: 1.0, $\lambda_1$: 0.9722222. $\lambda_2$: 0.73916483275. $\lambda_3$: 0.9462346, Encryption. Initialized with plaintext 6123, encoded in the state I/O as 0.6. 0.1, 0.2, 0.3. Dynamical I/O: 110101. Decryption. Initialized with ciphertext state: 0.6646249811, 0.4047112390, 1.0084771899, 2.0443172127. Recovered plaintext decoded from states at step 12: 6123. Recovered dynamical I/O: 000010010100.

| Encrypt Step | Dynamical | $v_0$ | $v_1$ | $v_2$ | $v_3$ |
|---|---|---|---|---|---|
| 0 |   | 0.6 | 0.1 | 0.2 | 0.3 |
| 1 | 0 | 0.8162277660 | 0.3680855879 | 0.4313030648 | 0.1399247631 |
| 2 | 0 | 0.7143433192 | 0.5106659147 | 0.1294170151 | 0.3313438413 |
| 3 | 0 | 0.7672342983 | 0.1880490330 | 0.3760980660 | 0.5641470990 |
| 4 | 0 | 0.7412289896 | 0.4915686649 | 0.5759939501 | 0.1868548574 |
| 5 | 1 | 0.2456522998 | 0.1675664602 | 0.2582528147 | 0.0654484810 |
| 6 | 0 | 0.9342659612 | 1.3287811518 | 0.2630573489 | 0.6554978228 |
| 7 | 0 | 0.6281932514 | 0.2392940406 | 0.4657953723 | 0.9189897466 |
| 8 | 1 | 0.1951202087 | 0.0764496206 | 0.1957324618 | 0.3016621533 |
| 9 | 0 | 0.9485754650 | 1.2873338760 | 1.5498570315 | 0.3822781157 |
| 10 | 1 | 0.3866151080 | 0.5396753700 | 0.8545889549 | 0.1646597858 |
| 11 | 0 | 0.8915944624 | 2.6662724210 | 0.4013074876 | 1.2801345102 |
| 12 | 0 | 0.6646249811 | 0.4047112390 | 1.0084771899 | 2.0443172127 |

| Step Decrypt | Dynamical | $v_0$ | $v_1$ | $v_2$ | $v_3$ |
|---|---|---|---|---|---|
| 0 |   | 0.6646249811 | 0.4047112390 | 1.0084771899 | 2.0443172127 |
| 1 | 0 | 0.8915944624 | 2.6662724210 | 0.4013074876 | 1.2801345102 |
| 2 | 0 | 0.3866151080 | 0.5396753700 | 0.8545889549 | 0.1646597858 |
| 3 | 1 | 0.9485754650 | 1.2873338760 | 1.5498570315 | 0.3822781157 |
| 4 | 0 | 0.1951202087 | 0.0764496206 | 0.1957324618 | 0.3016621533 |
| 5 | 1 | 0.6281932514 | 0.2392940406 | 0.4657953723 | 0.9189897466 |
| 6 | 0 | 0.9342659612 | 1.3287811518 | 0.2630573489 | 0.6554978228 |
| 7 | 0 | 0.2456522998 | 0.1675664602 | 0.2582528147 | 0.0654484810 |
| 8 | 1 | 0.7412289896 | 0.4915686649 | 0.5759939501 | 0.1868658574 |
| 9 | 0 | 0.7672342983 | 0.1880490330 | 0.3760980660 | 0.5641470990 |
| 10 | 0 | 0.7143433192 | 0.5106659147 | 0.1294170151 | 0.3313438413 |
| 11 | 0 | 0.8162277660 | 0.3680855897 | 0.4313030648 | 0.1399247631 |
| 12 | 0 | 0.6000000000 | 0.1000000000 | 0.2000000000 | 0.3000000000 |

ALTERNATE EMBODIMENT 3

This alternate embodiment shows one way in which as arbitrary cellular automaton, not necessarily a toggle rule such as is used in the preferred embodiment, may be used to embody the method and apparatus of this invention. It also illustrates the following important points:

Both forward and backward iteration can be used in encryption. (It will be appreciated that it has already been shown in alternate embodiments 1 and 2 that both forward and backward iteration can be used during decryption.) The number of either or both forward and backward iterations used in encryption need not correspond to the number of forward iterations used in decryption. Hence this information need not be part of the secret key, or part of a convention.

The representation of bits of the input information stream as (part of) a state of the system need not be unique. As shown in this embodiment each bit may typically be represented in many different ways, and the choice may be made according to either random or information-bearing parts of the input information stream.

The following facts concerning cellular automata operating on lattices with periodic boundary conditions must be explained before alternate embodiments 3 and 4 can be fully understood.

Under forward iteration any configuration on a spatially periodic lattice will eventually enter a temporal cycle. Under most cellular automata there are certain configurations which have no antecedent states. These configurations are known as "Gardens of Eden" since once left they cannot be reentered under forward iteration.

Configurations on a periodic lattice can be ordered. Hence, there is a configuration on every temporal cycle which is minimal in this ordering. This is one way in which a particular configuration on a temporal cycle can be distinguished from the others for coding purposes. Alternatively, the distinguished configuration could be the middle configuration of the ordering, or some other function of the ordering. Indeed, some function other than the ordering function could be applied to the configurations on the orbit in order to label them for coding purposes. What is essential for this application is that the orbits may be labeled in some unambiguous way.

All distinct temporal cycles that are possible for a given cellular automaton operating on a spatially periodic lattice of a given size can be found; for instance, by finding the periodic orbit arising from the application of the cellular automaton to every possible initial configuration.

All the configurations on a spatially periodic lattice can be organized into a collection of trees rooted on the temporally periodic cycles. The leaves of the trees are the Gardens of Eden, the branches of the trees consist of configurations which can be mapped both forward and backward in time. Configurations on the temporal cycles map to themselves after some number of forward iterations and/or some number of backward iterations. Configurations on the branches, by contrast, do not map to themselves under either forward or backward iteration.

TABLE 10

Lookup tables of cellular automaton rule 22, used as an
example key in alternate embodiments 3 and 4. Top: forward
iteration table, Bottom: inverse iteration table.

| Forward index | $x_{i-1}^t x_i^t x_{i+1}^t$ | $x_i^{t+1}$ |
|---|---|---|
| 0 | 000 | 0 |
| 1 | 001 | 1 |
| 2 | 010 | 1 |
| 3 | 011 | 0 |
| 4 | 100 | 1 |
| 5 | 101 | 0 |
| 6 | 110 | 0 |
| 7 | 111 | 0 |

| Inverse $x_i^t x_{i+1}^t$ | $x_i^{t+1}$ | $x_{i-1}^t$ |
|---|---|---|
| 00 | 0,1 | 0,1 |
| 01 | 0,1 | 1,0 |
| 10 | 0,1 | 1,0 |
| 11 | 0,1 | branch, terminate |

Initialization. To begin sending encrypted messages using this embodiment, two entities A and B share a secret which is comprised of 1) a cellular automaton rule, and 2) the size of the periodic lattice on which the cellular automaton operates. As in all of these embodiments, A and B must also agree on conventions for how the information stream is to be represented as states of the system, but these conventions need not be kept secret.

In the example shown in Tables 11–13, the secret key is the system size 23, and the nearest-neighbor cellular automaton rule under which the neighborhoods 100, 001, and 010 map to 1, and all other neighborhoods map to 0. In the standard nomenclature for cellular automata, this rule is known as rule 22. Note that rule 22 is not a left-toggle rule since both 011 and 111 map to 0, and it is not a right-toggle rule since both 110 and 111 map to 0. Table 10 (top) is a lookup table describing how to iterate rule 22 forward in time. A configuration of 0's and 1's is updated according to rule 22 by reference to this table as follows. For each site indexed i, the states of the cells in its neighborhood, in this case the sites indexed i−1, i, i+1 are found. The sequence of cell states in the neighborhood is treated as the binary expansion of an integer index into the table. The entry in the third column of that table at the row given by the index is the state of the site i at the next time step.

To each forward-iteration table, there is an inverse-iteration table, which is a reorganization of the information in the forward iteration table. The inverse iteration table for rule 22 is given in Table 10 (bottom). This inverse iteration table can be used to inverse iterate configurations on either periodic or non-periodic lattices. In this embodiment the lattice is periodic (so that, for instance, the site indexed N+1 is identified with the site indexed 1). To construct an antecedent state (at time t) for a configuration (at time t+1) on such a lattice, a site is chosen to be the initial site and is indexed N. The two sites to the right of the site N (sites indexed 1 and 2) in the antecedent state (the state at time t) are chosen according to information from the input information stream. These sites could, for instance, be assigned values at random.

Then, for each site indexed i=N down to i=1:

By reference to column 1 of Table 10 (bottom), the two site values at time t and indexed i and i+1, are used to determine which row of the table to use to find the state at time t of the site indeed i−1. If the site indexed i in the configured at time t+1 is 0 or 1 then the value from the left respectively right subcolumn of column 3 is used to find the state for the site indexed i−1 at time t. Notice that the fourth row contains the entries branch, terminate. If a branch entry is encountered, both possibilities, 0 and 1, must be considered. The state at time t constructed up to that point is recopied twice into a store, one copy is augmented with a 0, the other with a 1, and the process of building an antecedent state is continued on both copies. If a terminate entry is encountered, then there is no possible way to continue building an antecedent state, given the part built thus far. The effort is therefore abandoned. If need be, an antecedent state is reinitialized with new information from the input information stream and the process restarted.

After all sites have been assigned values in each of the copies produced, boundary conditions must be checked. Since the lattice is periodic, it must be checked if the values assigned to the sites N and N+1 are consistent under the cellular automaton rule with the given state at time t+1. If the site values are not consistent, then the presumptive antecedent state constructed above is not valid. If the configuration at time t is not a Garden or Eden, that is, if it does in

TABLE 11

Minimal representatives of the spatio-temporal orbits of nearest-neighbor cellular automaton rule 22 operating on system size 23.

| Codes for 0 | Codes for 1 |
|---|---|
| 00000000000000000000000 | 00000001010000110010011 |
| 00000000000000010000001 | 00000000001000001000101 |
| 00000000001010001000001 | 00000000111100000001111 | fact have at least one antecedent state, then the above process will find one or more of the antecedent states, given enough random initial starts.

Initialization. Before messages are sent, both A and B find all of the temporal cycles of rule 22 operating on a lattice of size 23. They have agreed beforehand that configurations are to be ordered like binary numbers, e.g.

00000000000000000000000 < 00000000000000000000001 etc. so that on each temporal cycle, taking into account all possible spatial shifts, there is one configuration which is the minimum on the cycle. A and B find that the minimum representative configuration on each of the distinct orbits are as given in Table 11. A and B agree further that if the sum of the rightmost three digits in a minimal representation of an orbit is 0 or 1, then the configuration will be used to encode 0, and if the sum is 2 or 3, then the configuration will be used to encode 1. Hence, each of the 4 configurations in column 1 of Table 11 can encode 0, and each of the three configurations in column 2 of Table 11 can encode 1. A first picks a number at random from the set 1, 2, 3, 4, and uses that number to decide which of the four configurations representing 0 to use. In table 12, A has chosen 4, and hence represents the 0 bit as the configuration 00000000001010001000001.

A then begins to inverse iterate the configuration. He decides that if a Garden of Eden is encountered, he will forward iterate 10 steps, and that if ever he is able to complete 5 inverse iterations in a row before a Garden of Eden is encountered, he will stop encrypting, and send the ciphertext. B does not need to know about these decisions, or any other detail of the operations performed by A during encryption, beyond the fact that the secret key was used.

In Table 12, the configurations generated in the course of encryption by A are shown. Only the last of the 10 configurations generated at each forward iteration phase is shown. Between steps 25 and 29, 5 inverse iterations in a row are performed, so A stops encrypting and sends the ciphertext 01000101001011001011011.

Decryption. B receives the ciphertext 01000101001011001011011 from A.

Rule 22 is applied forward in time until a configuration is generated which is a shift in space (in a circular register of size 23) of one of the configurations in Table 11. The configurations generated by B are shown in Table 13. At the second step, a configuration is generated with is a shift of the configuration in the first column, 4th row of Table 11. Hence, a 0 bit has been decrypted.

It will be appreciated that the intermediate states produced during encryption need not be related to the intermediate states produced during decryption. The use of cycles of a dynamical system as code words has been expressed here in terms of cellular automata. However, since continuous dynamical systems simulated in finite-precision hardware also have state spaces composed of trees rooted on cycles, this approach to embodiment of the invention can be taken with continuous dynamical systems as well.

TABLE 12 encryption with alternate embodiment 3. F: forward iteration, I: inverse iteration. The last column gives the total number of antecedent states for each configuration in column 3.

| step | direction | configuratin | antecedents |
|---|---|---|---|
| 0 |   | 00000000010100001000001 | 31 |
| 1 | I | 11110111101010110000000 | 0 |
| 2 | F | 10111000011100000001101 | 6 |
| 3 | I | 00010000001000000000101 | 21 |
| 4 | I | 01100000000111101110101 | 0 |
| 5 | F | 00000011111101110001110 | 8 |
| 6 | I | 11011100100101001110010 | 0 |
| 7 | F | 00010100010000001000000 | 21 |
| 8 | I | 11010101100000000110111 | 0 |
| 9 | F | 00111000000111111101110 | 8 |
| 10 | I | 00010000000001001000100 | 17 |
| 11 | I | 11100000000000110000011 | 48 |
| 12 | I | 01000000000000010111010 | 0 |
| 13 | F | 01010001000001000000000 | 31 |
| 14 | I | 10001110000001110111101 | 1 |
| 15 | I | 00000100000000010100101 | 6 |
| 16 | I | 11110101101101100011000 | 0 |
| 17 | F | 00110110111000111000000 | 8 |
| 18 | I | 00010100010000010000000 | 31 |
| 19 | I | 11100011010111010111011 | 0 |
| 20 | F | 00111000000011011011100 | 6 |
| 21 | I | 11001011011010001010011 | 0 |
| 22 | F | 00000000010100010000010 | 31 |
| 23 | I | 11011011010101100000001 | 0 |
| 24 | F | 01110000111000000011011 | 6 |
| 25 | I | 00100000010000000001010 | 21 |
| 26 | I | 11000000001101101110001 | 8 |
| 27 | I | 10000000000101000100000 | 31 |
| 28 | I | 01101101111000111000000 | 2 |
| 29 | I | 01000101001011001011011 | 0 |

TABLE 13

Decryption with alternate embodiment 3. The configuration at step 2 is a shift of the configuration in the first column, 4th row of table 11. Hence this configuration codes for "0"

| step | configuration |
|---|---|
| 0 | 01000101001011001011011 |
| 1 | 01101101111000111000000 |

TABLE 13-continued

| 2 | 10000000000101000100000 |
|---|---|

ALTERNATE EMBODIMENT 4

This alternate embodiment is similar to alternate embodiment 3. For illustrate purposes, it uses the same dynamical system as alternate embodiment 3. This embodiment differs from alternate embodiment 3 in that both encryption and decryption use only forward interation. Thus, this embodiment illustrates that even when irreversible dynamical systems are used, forward iteration alone can suffice to embody the invention. Notably, the advantage of the invention of associating many ciphertexts to a given plaintext which is due to the use of irreversible dynamical systems is retained in this embodiment. An advantage of this embodiment over alternate embodiment 3 is that in this embodiment the statistical properties of the ciphertext can be easily and explicitly specified, while this is difficult in alternate embodiment 3. Since only forward iteration is used during encryption in this embodiment, the dynamical I/O is not used to store and encrypt any portion of the information stream.

As in alternate embodiment 3, assume that two users A and B share the secret information that the nearest-neighbor cellular automaton rule 22 operating on system size 23 is to be used for encryption and

TABLE 14

Catalog of configurations coding for 0 and 1, for use in encryption in alternate embodiment 4.

| Codes for 0 | Codes for 1 |
|---|---|
| 00000010010010010110011 | 00001110001110000010000 |
| 00001001101100101111100 | 00010001100000110111011 |
| 00001011101011111100110 | 00010001100000110111011 |
| 00100000001110100000110 | 00011111111001111010010 |
| 00101011110101100001000 | 00101100110110000100100 |
| 01000110101110111100111 | 00111010101000100110100 |
| 01001100010100100111101 | 01000000001001001010001 |
| 01011011101001011110001 | 01110010100111101110101 |
| 10000001010110101000010 | 01111001000011010111111 |
| 10001100000101011110011 | 01111101011110011111101 |
| 10011011000000010101111 | 10010101111011001110110 |
| 10100101101001101111010 | 10010110110100100010101 |
| 10110110101111000011100 | 10101111110011011111101 |
| 11000100110001100111011 | 10110001100110111110111 |
| 11111010100010101101110 | 11000010011001000100100 |
| 11111111101010010001111 | 11110000101101111110000 | decryption. The same convention concerning the interpretation of the periodic orbits of this system are in force. To begin, we assume that both A and B have found the minimal representatives of the periodic orbits of this rule operating on a system of this size, as in Table 11.

Initialization. Before encrypting a message to B, A first makes a large catalog of random 23-bit strings. To each of the strings in the catalog, he assigns a label either 0 or 1. The label for each string is determined by 1) applying the rule 22 to the string until a periodic orbit is encountered, 2) finding the minimal representation of the orbit encountered, and then 3) determining from Table 11 if this minimal representation corresponds to a 0 or a 1. An example catalog constructed in this way is shown in Table 14.

Encryption. A can send an encrypted 0 bit to B by selecting at random a 23-bit string that is labeled 0. In the example considered here, he selects the 13th entry in column 1, table 14:

10110110101111000011100.

Decryption. B, upon receiving the random bit string, 10110110101111000011100, forward iterates the cellular automaton rule 22 to find a cycle, finds the minimal representative of the cycle, and finds the label of the minimal representative from Table 11.

These operations decrypt the random bit string. The sequence of operations performed by B is shown in Table 15. After forward iterating the string received from A 28 times, B finds that a configuration has been generated twice (at steps 20 and 28) and hence knows that a cycle (of length 8) has been entered. The minimal representative of the cycle is then found. In this example the minimal representative is generated at step 23 of the decryption. In general, the minimal representative will be a shift of one of the cycle configurations generated during the forward iteration operation. By examination of Table 11, B finds that this minimal representative codes for 0.

TABLE 15

Decryption of the block 10110110101111000011100 in alternate embodiment 4. A cycle of length 8 is entered at step 20. The minimum representative of the orbit: 00000000000000010000001 is produced at step 23. By reference to table 11, it codes for "0";

| Step | Configuration |
| --- | --- |
| 0 | 10110110101111000011100 |
| 1 | 10000000100000100100011 |
| 2 | 01000001110001111110100 |
| 3 | 11100010001010000000110 |
| 4 | 00010111011011000001000 |
| 5 | 00110000000000100011100 |
| 6 | 01001000000001110100010 |
| 7 | 11111100000010000110111 |
| 8 | 00000001000011001000000 |
| 9 | 00000111001000111100000 |
| 10 | 00001000111101000010000 |
| 11 | 00011101000001100111000 |
| 12 | 00100001100010011000100 |
| 13 | 01110010010111100101110 |
| 14 | 10001111110000011100001 |
| 15 | 01010000001000100010010 |
| 16 | 11011000011101110111111 |
| 17 | 00000100100000000000000 |
| 18 | 00001111110000000000000 |
| 19 | 00010000001000000000000 |
| 20 | 00111000011100000000000 |
| 21 | 01000100100010000000000 |
| 22 | 11101111110111000000000 |
| 23 | 00000000000000100000001 |
| 24 | 10000000000001110000011 |
| 25 | 01000000000010001000100 |
| 26 | 11100000000111011101110 |
| 27 | 00010000001000000000000 |
| 28 | 00111000011100000000000 |

THE DYNAMICAL I/O

In the preferred embodiment using left-toggle rules, the dynamical I/O comprises the right-most 2r processors at each step of encryption/decryption. In the simplest mode or operation of this embodiment, the dynamical I/O is used merely as a place to load random information during the encryption process. In some applications, it may be desirable to reverse part of the dynamical I/O to hold non-random information, such as, for example, an auxiliary message. This auxiliary message can be loaded into the dynamical I/O during encryption and recovered from there during the decryption process. Indeed, in some embodiments, it is possible to encode all meaningful information to be encrypted into the dynamical I/O, and choose the initial states of the dynamical systems purely at random.

Figure 9:
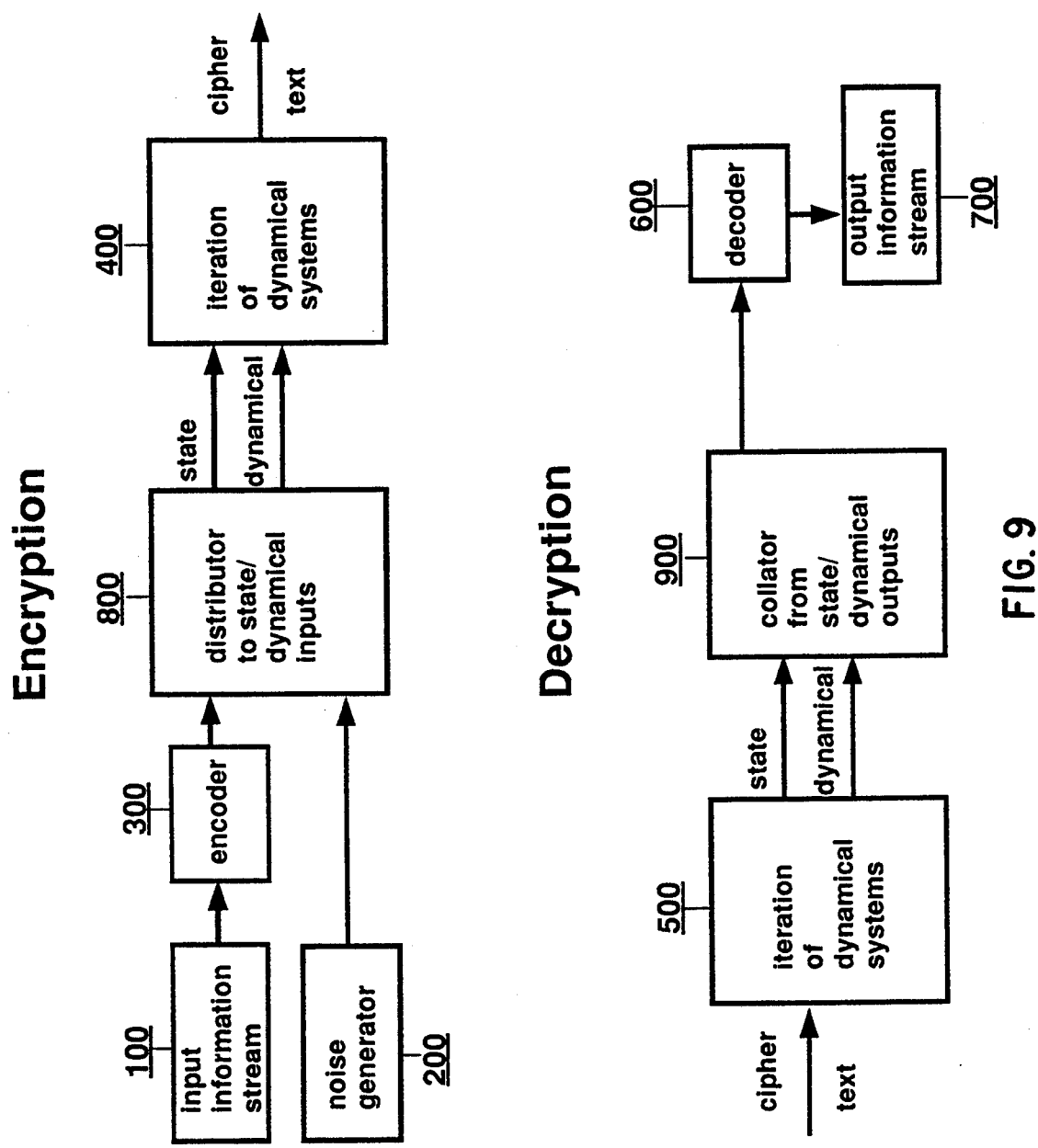
FIG. 9 is a diagram showing the use of the dynamical I/O to process non-random information.

In order to use the dynamical I/O to process non-random information, some modifications to the overview presented in FIG. 1 are necessary. Referring now to FIG. 9, these modifications are shown. These modifications involve the installation of two new parts 1) a distributor to the state and dynamical inputs 800, and 2) a collator from the state and dynamical outputs 900. Just as the pairs of parts (300, 600) and (400, 500) execute processes which are inverses of each other, the distributor 800 performs an operation during encryption which is undone during decryption by the collator 900. Several different application of these parts will be discussed below. The optimal hardware configuration for these these parts depends highly on the application. In some cases, they can be embodied simply as a look-up table in read-only memory; in others, some (low-level) computations must be performed as well.

As an example of a very simple use of the dynamical I/O to process non-random information, consider again the application to international band communication. Imagine that blocks to be encrypted always contain a string of numbers. Either all of these number represent dollar amounts, or all of these number represent yen amounts. Rather than redundantly transmitting the dollar or yen symbol in front of each number, a dollar/yen bit can be set in the dynamical input by distributor 800, and read for the dynamical output by collator 900. The rest of the bitss in the dynamical input may be set with random bits from the noise generator 200, as previously described.

In other applications, the dynamical input may contain an address to which the message in the state I/O should be sent upon decryption, a time-stamp, or other identifying information. For example, in an application to digital television encryption, the state I/O could contain the visual information, and the dynamical I/O the auditory information. The parameters of the encryption can always be adjusted such that non-random input to the dynamical I/O does not compromise in any way the security of the information in the state I/O. It will also be appreciated that with the system described here, encryption information may be included in the dynamical I/O, the original state information, or both. The information to be encrypted will therefore be defined as the information stream regardless of where the information is to be encrypted in accordance with the selected embodiment of the invention.

SELF-SYNCHRONIZED KEY STREAMS

An important use of the dynamical I/O is in self-synchronized stream encryption. In the self-synchronized stream mode, each block of plaintext is encrypted and decrypted with a different, generally random, key. The first block in the stream is encrypted and decrypted using the secret key. The key for encryption/decryption of a subsequent block is placed in the dynamical I/O during encryption of a previous block or blocks. During decryption, the key for the subsequent block is read from the dynamical I/O during decryption of the previous block or blocks. This method of stream encryption is called self-synchronizing to distinguish it from other methods in which a key stream is generated separately from the ciphertext stream, to which it must be synchronized for decryption. Previous methods of producing self-synchronization of key streams have relied on using bits from already enciphered text to determine the next key. It will be appreciated that when the key stream is placed in the dynamical I/O as is possible with this invention, no bits of any of the keys need appear in the ciphertext stream, and hence in view of eavesdroppers. All bits of the key stream are regenerated at the receiving end from intermediate stages of decryption. Stream encryption requires that the hardware be modified so that there is in addition to the parts specified above a buffer, which can be mearly a duplicate of the memory array 10.

Figure 10:
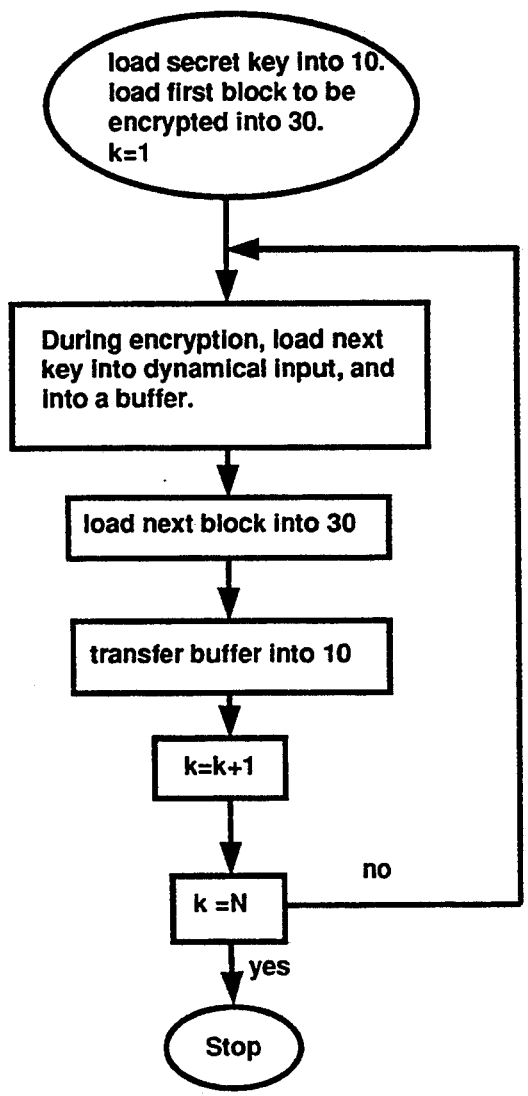
FIG. 10 is a flow chart showing stream encryption.
Figure 10:
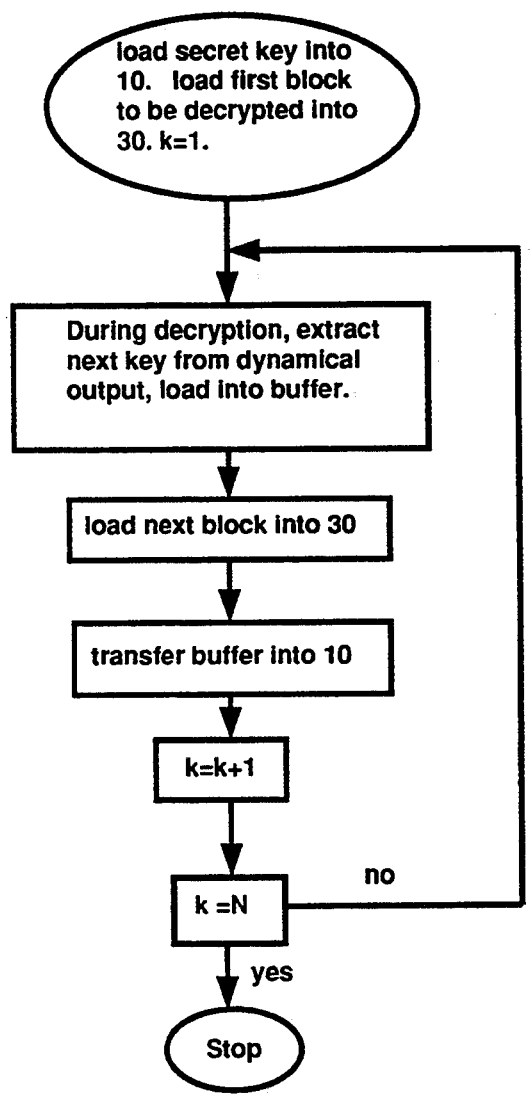

FIG. 10 presents a flow chart for stream encryption/decryption. It is assumed that N blocks are to be encrypted/decrypted. This figure illustrates the following steps:

Stream Encryption. Initialization: The secret key is loaded into rule table 10, whereupon it becomes the current key. The first block to be encrypted is loaded into 30, whereupon it becomes the current block. The index k is set to 1.

For each block to be encrypted:

Distributor 800 is used to load a next key into the dynamical I/O, generally using information from the noise generator 200, saving this key in a buffer.

The next block is loaded into 30.

The buffer is transferred into 10 whereupon it becomes the current key.

The index k is incremented. If k is N, the process is stopped.

Stream Decryption. Initialization: The secret key is loaded into rule table 10, whereupon it becomes the current key.

The first block of ciphertext to be decrypted is loaded into 30 whereupon it becomes the current block.

The index k is set to 1.

For each block to be decrypted: During decryption, the next key is extracted from the dynamical input and loaded into a buffer.

The next block is loaded into 30.

The buffer is transferred into 10 whereupon it becomes the current key.

The index k is incremented.

If k is N, the process is stopped.

Table 16 shows the encryption/decryption of two blocks using stream encryption. The first block is encrypted/decryption using as secret key the cellular automaton rule 30 of Table 2. The second block is encrypted/decrypted using the cellular automaton rule 60 of Table 2. The four bits which, when fed to the rule-table setter 20, specifying rule 60, are placed in the dynamical input during encryption of the first block, the first two bits, 0 and 0 are placed at step 1 of encryption of the first block, and the next two bits, 1 and 1, are placed at step 2 of encryption of the first block.

TABLE 16

Stream Encryption/Decryption of two blocks, $b_1$ and $b_2$. The plaintext appears at step 0 of encryption, and step 5 of decryption. The ciphertext appears at step 5 of encryption and step 0 of decryption.

| key 01111000 | encrypt $b_1$ |
|---|---|
| 0 | 01100010110100011011100001010 |
| 1 | 000111100010111010001111011000 |
| 2 | 111010011101100101111001000111111 |
| 3 | 1001100001000110101001110000010011 |
| 4 | 10000111110000010101110011111101111001 |
| 5 | 10000001001111101100010000100110011010 |

| key: 00111100 | encrypt $b_2$ |
|---|---|
| 0 | 01100110110000010111100001010 |
| 1 | 110111011011111110010111100111 |
| 2 | 10110100100101010001101010001010 |
| 3 | 100100111000110011110110011111100111 |
| 4 | 10001110100001000101001000101001010001010 |

TABLE 16-continued

| 5 | 10000101100000111100111000011000011000 |
|---|---|
| key: 01111000 | decrypt $b_1$ |
| 0 | 10000001001111101100010000100110011010 |
| 1 | 10000111110000010101110011111101111001 |
| 2 | 1001100001000110101001110000010011 |
| 3 | 111010011101100101111001000111111 |
| 4 | 000111100010111010001111011000 |
| 5 | 01100010110100011011100001010 |

| key: 00111100 | decrypt $b_2$ |
| 0 | 10000101100000111100111000011000011000 |
| 1 | 10001110100001000101001000101001010001010 |
| 2 | 100100111000110011110110011111100111 |
| 3 | 10110100100101010001101010001010 |
| 4 | 110111011011111110010111100111 |
| 5 | 01100110110000010111100001010 |

ERROR CORRECTION

In order to render code-breaking and tampering extremely difficult, this system has been designed to be maximally sensitive to any changes in the key, the ciphertext, or the plaintext. Therefore when the invention is used to transmit encrypted information across noisy channels, error correction should be provided. A simple means to achieve error correction is to encrypt and transmit each block of plaintext a plurality of times. At the receiving end each block is separately decrypted, and a correct message is computed by taking the majority over the decrypted blocks.

As pointed out above, each time a block is encrypted, a different ciphertext is produced. Repetition of the plaintext does not produce repetition in the ciphertext. There is no information due to repetition that an eavesdropper could use to attempt to break the code. Hence, error correction by this means does not reduce the security of the system.

Use of this invention in stream-encryption mode may produce a higher level of security against tampering than use in the in block-encryption mode. This is because one error introduced in the encryption of the embedded key stream may garble all succeeding message blocks. This same property makes the system particularly sensitive to noise on transmission lines in stream-encryption mode. This again may be handled by error correction. One useful method, which need not introduce any overhead in the number of encrypted bits which must be transmitted, is to place several copies of the information producing the next key in the dynamical I/O during encryption. During decryption error correction is performed by comparing these copies and taking a majority.

COMPOSITION OF RULES

The invention has thus far been described as using a single given dynamical system for the encryption of a given block. While this is the simplest mode of operation of the invention, a more complicated mode of operation is possible in which different steps of encryption are performed using different dynamical systems. If steps of encryption i=0... n of a given block are performed using dynamical system keys $K_0, K_1 \ldots K_n$ in order, then in general these dynamical systems must be applied in reverse order during decryption of that block. Composition of rules requires but a minor modification of the use of the apparatus of the preferred embodiment as specified above. In rule composition, after each cycle of encryption or decryption of a given block, a new key is loaded into the rule table 10, whereas in the embodiments described above, the same key was assumed to reside in rule table 10 for all n steps of encryption/decryption.

In the preferred embodiment, the effect of using different rules for different steps of encryption is to increase the effective radius of the encryption rule. That is, given two rules $K_0$ and $K_1$ both of radius r, the effect of applying rules $K_0$ and then rule $K_1$ during encryption and then applying $K_1$ and then $K_0$ during decryption is the same as applying a new rule $K = K_1 \cdot K_0$ which is of radius 2r. The symbol " $\cdot$ " here represents functional composition. This property may be useful in hardware implementations in which the radius of the rules which can be used is limited by memory size.

ASSURED TAMPER PROTECTION

Another use of rule compositions in the preferred embodiment is to achieve a property which will be called assured tamper protection. This means that single-bit errors introduced in either the ciphertext or plaintext of a block are assured to propagate across the entire block. If only left-toggle rules or only right-toggle rules are used for encryption, then a one-bit error introduced by a tamperer into the plaintext or an intermediate-stage ciphertext will propagate during subsequent encryption steps only to positions in one direction from the position at which the error is introduced. To assure that the error also propagates to positions in the other direction, encryption can be performed using left- and right-toggle rules for selected steps of encryption. Even if only left-toggle or only right-toggle rules are used, errors may propagate in both directions during decryption. Use of compositions of both left- and right-toggle rules helps assure that this will happen.

PARTIAL ENCRYPTION/DECRYPTION

With the combination of the capability of the process in accordance with this invention to store information in the ciphertext during the process of encryption and dynamical system composition, there is achieved a very powerful method defined herein as partial encryption/decryption. It has been discovered that nearly any prior-art encryption process E can be composed with another prior-art encryption process E' to act on a message M to produce a doubly-encrypted message E (E'(M)). An entity A in possession of the decryption method D corresponding to the encryption process E, but not eh decryption method D' corresponding to the encryption process E' can act on the doubly-encrypted message to recover E'(M). However, since A does not possess D', it gains no information by doing so. If in the same situation E and E' are encryption methods designed according to this invention, by contrast, then by applying D to the doubly-encrypted message, A recovers information which was stored during encryption with E. A can still not read the message M since it remains encrypted, but may have gained information useful for the further processing of the singly-encrypted message E'(M). Thus A has partially decrypted the doubly-encrypted message E(E'(M)).

Partial encryption enables information of different levels of security and/or destined for different uses to be encrypted into the same ciphertext. This property has many applications. Here several such applications will be described.

AUTHORIZATION

Assume that two users A and B share a secret key K and wish to communicate with each other over a computer network composed of many nodes (see table 17). Since even the address to which a message is being sent may need to be securely protected, they do no want any unauthorized nodes to be able to communicate their messages, though many nodes may be able to intercept a message. There should be no node that can actually read a message. To authorize a node to send a message from A to B, A gives another key $K_A$ to the node, for example N. It will be appreciated that to each key, K, there is a corresponding encryption method $E_K$ which involves application some number of times of the dynamical system described by K. To send a message M to B, A first encrypts with $E_K$ and then with $E_{K_A}$. The encryption with $E_K$ is initialized with the message in the state I/O. During encryption with $E_{K_A}$, A inserts B's address in the dynamical I/O. Any node other than the authorized node which intercepts the ciphertext will not know where the message is to be sent. The authorized node, however, can apply $E_{K_A}$ to extract the address (but not the message itself) and can then direct the message encrypted under $E_K$ to B.

TABLE 17

| Example of use of two-key authorization. | | | |
|---|---|---|---|
| Who | Action / After Action | State | Dynamical |
| A $\rightarrow$ N | $\dfrac{E_{K_A}E_K}{E_{K_A}E_K(M)}$ | write: Hi, B | write: 7 Key Street |
| N $\rightarrow$ B | $\dfrac{D_{K_A}}{E_K(M)}$ | | read: 7 Key Street |
| B | $\dfrac{D_K}{M}$ | read: Hi, B | |

MULTI-KEY AUTHORIZATION

While the authorization task discussed above required the use of but two keys, other authorization applications employing the same method of partial encryption/decryption may require the use of many keys. As an example, let us assume that a firm distributes a data base composed of records $R_1, R_2, \ldots$ each encrypted under a key $K_1, K_2, \ldots$ and then another key K. A buyer of the data base receives the key K, but not the other keys $K_1, K_2, \ldots$ By applying $E_K$ to any record in the data base, the buyer can decrypt some general descriptive information about the record, a price, and a record identification number, as this information was placed in the dynamical I/O during encryption of the record with $E_K$. If the buyer decides that he is willing to pay the firm the price indicated in order to obtain the full information in the record, he can send the appropriate fee along with the record identification number to the firm, which will then furnish the key needed to fully decrypt the record.

AUTHENTICATION

One way in which a private-key cryptographic system, such as the present invention, can be used for authentication has been described by Merkle (R. C. Merkle, Protocols for Public-Key Cryptosystems. (1980 Symp. on Security and Privacy, IEEE Computer Society, 1980)). In Merkle's scheme. Two users A and B communicate signed messages to each other using a trusted third party S. S is an authentication server. For instance. A could be the holder of a bank-machine card, B the bank issuing the card, and S a company under contract to authenticate back machine usage. Each user A and B shares a secret key, $K_A$ and $K_B$ with S. To send an authenticated message, M, to B, A encrypts M under $E_{K_A}$ and sends the ciphertext to B. B, in turn, sends the ciphertext to S. S decrypts M with $E_{K_A}$, re-encrypts M with $E_{K_B}$ and sends the new ciphertext to B, who is finally able to decrypt it. The message is considered to be authenticated since S is trusted by both A and B to be the only party capable of encrypting and decrypting with both $E_{K_A}$ and $E_{K_B}$. B cannot even read the message unless A has vouched for its authenticity. One of the problems with this scheme is that the trust in S must be absolute. That is, S is trusted with handling and not revealing to others plaintext generated by both A and B. In Merkle's scheme S could forge either A's or B's signature on plaintext of its choosing; misplaced trust could be disastrous.

This problem is solved in accordance with this invention to enable cryptographic authentication as illustrated in several example applications described below. Under prior-art authentication schemes a sender "signs" a message by applying a transformation known only to him (and, perhaps, a trusted third party). Authentication under the present invention can use this implicit method of authentication, but can, in addition, allow messages to be explicitly signed, validated, registered, etc. by encryption of information in addition to the primary message into the dynamical input. The three examples below are a sequence of increasingly complicated applications which illustrate the method.

TWO-KEY AUTHENTICATION

For example, a student is applying for a grant from a government agency (Table 18). He needs a letter of recommendation from a professor at a different college. The student is responsible for transmitting the message to the granting agency, and verify that it did indeed come from said professor. Only the granting agency, and not the student, should be able to read the letter of recommendation. All transmission of information is to be via insecure electronic mail.

In accordance with the present invention, this problem is handled as follows. Two keys are required, one is used only for authentication, the other only for secrecy of the letter. The student and the professor share the authentication key $K_{aut}$ and the professor and the granting agency share the secrecy key $K_{sec}$. The professor sends his letter to

TABLE 18

Example of two-key authentication.
P: professor, S: student, G: government.

| Who | Action After Action | State | Dynamical |
|---|---|---|---|
| P → S | $E_{K_{aut}}E_{sec}$ / $E_{K_{aut}}E_{sec}(M)$ | write: S is A+ | write: I am P |
| S → G | $D_{K_{aut}}$ / $E_{K_{sec}}(M)$ |  | read: I am P |
| G | $D_{K_{sec}}$ / M | read: S is A+ |  | the student encrypted first with $K_{sec}$ and then with $K_{aut}$. During encryption with $K_{aut}$, the professor explicitly signs the letter by placing information identifying himself to the student in the dynamical input, and then sends the doubly-encrypted letter to the student. The student partially decrypts the letter using $K_{aut}$. He is satisfied that the professor and only the professor wrote the letter since 1) only the professor and the student possess $K_{aut}$, and 2) he has read the encrypted statement the processor placed in the dynamical I/O which identifies him. He then sends the singly encrypted message to the granting agency, which fully decrypts it using $K_{sec}$.

THREE-KEY AUTHENTICATION

Three-key authentication in accordance with the present invention is an improved method of authentication over Merkel's scheme described above. In accordance with the invention, users A and B share a secret key K with each other, and A shares a secret key $K_A$ with the intermediary S, and B shares a secret key $K_B$ with the intermediary S. Preferably K is used only for secrecy of communication between A and B, while $K_A$ and $K_B$ are used only for authentication of the communication between A and B. To send an authenticated message M to B, A encrypts M first with $E_K$, and then with $E_{K_A}$. During encryption with $E_{K_A}$, A inserts authentication information into the dynamical I/O. A then sends the doubly-encrypted message $E_{K_A}(E_K(M))$ to B. B cannot decrypt the message since B is not in possession of $K_A$. To authenticate the message B sends the ciphertext it has received, $E_{K_A}(E_K(M))$, to S. S applies $E_{K_A}$ to recover the authentication information in the dynamical I/O. S is then left with the ciphertext $E_K(M)$ which it cannot read, since it is not in possession of K. S then encrypts $E_K(M)$ with $E_{K_B}$ to produce $E_{K_B}(E_K(M))$. Advantageously, S can insert information into the dynamical I/O during this encryption attesting its authentication of the message. S then sends $E_{K_B}(E_K(M))$ to B, who is able to decrypt both S's attestation, and A's message.

THREE-KEY AUTHENTICATION WITH NOTARIZATION AND ELECTRONIC RECEIPTS

This example extends three-key server-mediated authentication to include two new methods 1) electronic notarization, in which the history of a communication is accumulated in the dynamical I/O in an encrypted form, and registered by a disinterested third-party and 2) electronic receipts in which at the end of a complete communication, both communicating parties possess an encrypted record, validated by the server, which they themselves cannot tamper with or forge, but which can be used by a judge to resolve any disputes concerning the communication.

To illustrate this method in a concrete application, consider a situation in which user A, a client of the US bank B, travels to foreign country and while there can only communicate with the bank B via an insecure bank machine.

There is a server S in the US who purpose is to 1) validate A's signature in his absence. 2) issue communication receipts to both communicating parties. 3) maintain a log of communication which will be legal evidence should either party sue concerning their communication, and 4) issue electronic receipts to be used by a judge in settling disputes between A and B regarding their communication.

A typical communication is shown in Table 19. Note that each time an entity performs some part of the communication, it records this action into the dynamical I/O.

Initialization. Key Exchange: Before leaving on the trip: A and B share secret key K. A and S share $K_A$ and B and S share $K_B$ Step 1) A encrypts the primary message: "send me $1000.00" into the state input of $E_K$, and signs the message, stating the action he has taken into the dynamical I/O of $E_{K_A}$. Additional information, such as the time the message is sent, place of origin etc., could also be included. The result is sent to B.

Step 2) B further encrypts the message with $E_{K_B}$, placing a statement of his belief that the message came from A in the dynamical I/O. This is only a statement of belief, not certitude, since the message has not yet been authenticated. B sends the result to S.

Step 3) S decrypts with $D_{K_B}$ and then $D_{K_A}$, reading from the dynamical input the communication transaction record accumulated thus far. S is certain that the message is authentic since only it is entrusted with the keys $K_A$ and $K_B$. It has further checks on the validity and intention of the communication on the basis of the statements made by the communicating parties.

Step 4) S then registers the authentic transaction in an electronic log.

Step 5) S issues an electronic receipt to B. This receipt contains the full transaction history in the dynamical I/O. B cannot read or alter the history since it is encrypted with $E_{K_A}$ as well as the keys which it possesses.

Step 6) Similarly. S issues an electronic receipt to A.

Step 7) S encrypts with $K_B$, including an attestation of the authenticity of the communication, and sends to B.

Step 8) finally, B receives the result of step 7, from which it is able to decrypt both the message from A and S's attestation.

Note that throughout all intermediate steps of communication the primary message remains encrypted.

Should either party, A or B, contest the communication before a judge, the judge can fairly arbitrate in collaboration with the server S. S supplies the judge with the keys $K_A$ and $K_B$. The contesting party supplies the judge with his receipts. The judge can then decrypt the transaction history from the receipt and thus settle the dispute, without ever being able to decrypt the actual message, since the judge does not possess the key K.

It will be understood that the means of communication of the encrypted messages between the parties are not limited to the use of modems. The messages may be transmitted by way of written documents, telephonic or telegraphic or radio communications and the like, as well as via television signals or facsimile transmissions.

The following references have been referred to in the body of the specification:

M. Bianco and D. Reed. U.S. Pat. No. 5,048,086.

S. Wolfram Cryptography with Cellular Automata, (Proceedings of Crypto '85, pp. 429–432, 1985).

S. Wolfram, Random Sequence Generation by Cellular Automata, (Adv. Applied Math. 7 (1986)).

E. Denning, Cryptography and Data Security, (Addison-Wesley, 1982).

H. Gutowitz, Cellular Automata: Theory and Experiment, (MIT Press, 1991).

J. Gleick, Chaos. (Penguin Books, 1988).

H. G. Schuster, Deterministic Chaos, (Physik-Verlag, 1984).

R. C. Merkle, Protocols for Public-Key Cryptosystems, (1980 Symp. on Security and Privacy. IEEE Computer Society, 1980).

P. Guan, Cellular Automaton Public-Key Cryptosystems, (Complex Systems 1, 1987).

J-P Delahaye, Les Automates, (Pour La Science, Nov. 1991, pp. 126–134).

TABLE 19

Example of three-key authentication with registration and issuance of electronic receipts. In addition to the use of the dynamical I/O outlined in the table, at step 1 a message, e.g. "Send me $1000.00" is placed in the state I/O by A, and at step 8 it is read from there by B.

| Step | Who | Action/ After Action | Dynamical I/O |
|---|---|---|---|
| 1 | A → B | $\dfrac{E_{K_A}E_K}{E_{K_A}E_K(M)}$ | write: I, A, am transmitting this to B. |
| 2 | B → S | $\dfrac{E_{K_B}}{E_{K_B}E_{K_A}E_K(M)}$ | write: I, B, believe I got this from A. |
| 3 | S | $\dfrac{D_{K_A}D_{K_B}}{E_K(M)}$ | read: I, B, believe I got this from A. I, A, am transmitting this to B. |
| 4 | S | Register valid transaction | |
| 5 | S → B | $\dfrac{E_{K_A}E_{K_B}}{E_{K_A}E_{K_B}E_K(M)}$ | write: Full Transaction History |
| 6 | S → A | $\dfrac{E_{K_B}E_{K_A}}{E_{K_B}E_{K_A}E_K(M)}$ | write: Full Transaction History |
| 7 | S → B | $\dfrac{E_{K_B}}{E_{K_B}E_K(M)}$ | write: I, S, attest that this message came from A. |
| 8 | B | $\dfrac{D_{K_B}D_K}{M}$ | read: I, S, attest that this message came from A. |

What is claimed is:

1. A method for encrypting information comprising the steps of:
   establishing a plurality of dynamical systems to be used as keys for encryption;
   selecting from said plurality of dynamical systems a plurality of current-key dynamical systems to be used as current keys for encryption;
   choosing at least one of said current-key dynamical system, the chosen dynamical system being an irreversible dynamical system;
   defining a current state of at least one of the current-key dynamical systems in correspondence with at least a portion of an information stream to be encrypted; and
   applying said at least one of said current-key dynamical systems over a selected number of iteration cycles to produce from said current state a new state of said at least one of said current-key dynamical systems, said new state representing an encryption of the information.

2. The method of claim 1 further comprising the step of using as keys a plurality of dynamical systems, a plurality of which are irreversible and deterministic.

3. The method of claim 1 wherein said information stream includes random information.

4. The method of claim 1 wherein said information stream includes pseudo-random information.

5. The method of claim 1 wherein said information stream includes authentication information.

6. The method of claim 1 wherein current keys are selectively applied forward and backward over a plurality of cycles to produce new states of said current keys.

7. The method of claim 1 wherein at least one other new current key is selected from said plurality of dynamical systems used as keys to be applied during a selected one of said iterations.

8. The method of claim 7 wherein a selected current key to be applied in a subsequent iteration is derived from part of the information stream.

9. The method of claim 1 further comprising the step of decrypting the desired encryption information by iterating the state of the dynamical system representing the encryption information in the reverse direction from that used in the encryption steps.

10. The method of claim 9 wherein the iterating steps for decryption are not symmetrical with the iteration steps of encryption of the information stream.

11. The method of claim 1 wherein the iterative steps are accomplished using parallel processing means.

12. The method of claim 1 wherein at least one of said dynamical systems is a cellular automaton.

13. The method of claim 12 wherein at least one of the dynamical systems is a toggle cellular automaton.

14. Apparatus for the encryption and decryption of a message comprising:
a first memory array for storing values;
first data processing means connected to the first memory array, said first data processing means being operative for setting values into said first memory array in correspondence with a description for a selected dynamical system;
a second memory array for storing a current state of the selected dynamical system along with other input information; and
second data processing means connected to the first and second memory arrays for operating on data stored in said second memory array in accordance with the values in the first memory array to derive a new state of the selected dynamical system, one of said current and said new states corresponding to the message and the other of said current and said new states corresponding to an encryption of the message.

15. The apparatus of claim 14 further comprising:
encoder means operative to encode at least a portion of the messages into an initial state of the selected dynamical system for storing in the second memory array; and
means for generating and for storing said other input information in said second memory array.

16. Apparatus for encryption and decryption of a message according to claim 14 wherein said second data processing means comprises a plurality of digital data processors connected in a regular array, each said digital data processor being operatively connected to others of said digital data processors in the array, said digital data processors including means for calculating a next state of each digital data processor in the array according to a selectable dynamical system which gives a next state of each digital data processor as a function of its own current state and a current state of determined processors in the array.

17. The apparatus of claim 4 wherein at least one of said dynamical systems is a cellular automaton.

18. The apparatus of claim 17 wherein at least one of said dynamical systems is a toggle cellular automaton.

19. The apparatus of claim 16 wherein the second data processing means includes means for repeatedly applying the dynamical system over a plurality of cycles to calculate the state of each of the digital data processors in the array.

20. The apparatus of claim 15 wherein the means for generating further comprises a distributor means.

21. The apparatus of claim 14 further comprising collator means connected to receive decrypted information and separate determined information therefrom.

22. The apparatus of claim 14 further comprising means for changing the values stored in the lookup table after a predetermined block of the message has been encrypted.

23. The apparatus of claim 14 wherein said second data processing means further comprises means for using the intermediate states of encryption of a block of the message to form the encryption key for other of blocks of the message, whereby a stream of keys is generated from the data.

24. The apparatus of claim 14 wherein
said first memory array stores said values as a lookup table;
said first data processing means is operative for setting said values into said first memory array in correspondence with a rule table for the selected dynamical system; and
said second data processing means operates on data stored in said second memory array in accordance with the values in the lookup table in the first memory array to derive a new state of the selected dynamical system, respective ones of said states corresponding to at least part of the message and an encryption of said at least part of the message.

25. The apparatus of claim 24 wherein said second data processing means comprises a plurality of digital data processors connected in a regular array, each said digital data processor being operatively connected to others of said digital data processors in the array, said digital data processors including means for calculating a next state of each digital data processor in the array according to a selectable cellular automaton rule which gives a next state of each digital data processor as a function of its own current state and a current state of determined processors in the array.

26. The apparatus of claim 25 wherein all of the processors of said second data processing means can read from the first memory array and are connected to read and write to an associated memory element of said second memory array, a first processor of the plurality of digital data processors being connected to read the information from said first memory array and a last processor being connected to write to the first memory array only, all said processors excepting the first processor being connected to read from another memory element other than its associated memory element.

27. The apparatus of claim 26 wherein there are n digital data processors respectively indexed 0 through $n-1$ and only the processor having index number 0 in the array need be able to read from the first memory array and only the digital data processor labeled $n-1$ need be able to write to the first memory array, all of the digital data processors except the one labeled 0 being connected to read the value from a memory element of said second memory array which is indexed 1 less than its own index number.

28. Apparatus for the encryption and decryption of a message comprising:
   a first memory array for storing values in a lookup table;
   first data processing means connected to the first memory array, said first data processing means being operative for setting values into said first memory array in correspondence with a rule table for a selected dynamical system;
   a second memory array for storing a current state of the selected dynamical system along with other input information; and
   second data processing means connected to the first and second memory arrays for operating on data stored in said second memory array in accordance with the values in the lookup table in the first memory array to derive a new state of the selected dynamical system, one of said current and said new states corresponding to the message and the other of said current and said new states corresponding to an encryption of the message.

29. A method for encrypting an information stream comprising the steps of:
   establishing a plurality of dynamical systems to be used as keys for encryption;
   selecting from said plurality of dynamical systems a plurality of current-key dynamical systems to be used as current keys for encryption;
   choosing at least one of said current-key dynamical systems, the chosen dynamical system being an irreversible dynamical system;
   defining a current state of at least one of the current-key dynamical systems in correspondence with at least a portion of an information stream to be encrypted and in correspondence with dynamical information of said information stream; and
   applying said at least one of said current-key dynamical systems over a selected number of iteration cycles to produce from said current state a new state of said at least one of said current-key dynamical systems, said new state representing an encryption of the information stream.

30. The method of claim 29 wherein a message to be encrypted is included in the dynamical information.

31. Apparatus for encrypting and decrypting an information stream comprising:
   a first memory array for storing values;
   first data processing means connected to the first memory array, said first data processing means being operative for setting values into said first memory array in correspondence with a description for a selected dynamical system;
   a second memory array for storing a current state of the selected dynamical system along with other input information; said state and said other information comprising the information stream;
   distributor means for inputting said state and said other information; and
   second data processing means connected to the first and second memory arrays for operating on data stored in said second memory array in accordance with the values in the first memory array to derive a new state of the selected dynamical system, respective ones of said current and said new states corresponding to the information stream and an encryption of the information stream respectively;
   means for transmitting the encryption of the information stream; and
   means for receiving and decrypting the encryption of the information stream including
   a third memory array for storing values;
   third data processing means connected to the third memory array, said third data processing means being operative for setting values into said third memory array in correspondence with the description for the selected dynamical system;
   a fourth memory array for storing a current state of the selected dynamical system in correspondence with a received encryption of the information stream;
   fourth data processing means connected to the third and fourth memory arrays for operating on data stored in said fourth memory array in accordance with the values in the first memory array to derive a new state of the selected dynamical system, respective ones of said current and said new states corresponding to the information stream and an encryption of the information stream; and
   collator means for separating said state information and said other input information for completely decrypting the information stream.

32. A method for encrypting information comprising the steps of choosing a description of a dynamical system and a size of a periodic lattice upon which the described dynamical system will operate;
   finding all temporal cycles of the described system operating on the chosen lattice and labeling the temporal cycles in accordance with an agreed upon rule; at least one of said description, lattice size and labeling rule being kept secret between a sender and recipient; selecting encoding rules in accordance with a distinguished configuration of the temporal cycles;
   choosing a particular configuration for encoding selected information; and
   selectively iterating the configuration in accordance with the chosen description in order to generate a ciphertext of the selected information.

33. The method of claim 32 further comprising the steps of decrypting the ciphertext by further iteration of the ciphertext until a correspondence with a distinguished configuration is determined and decrypting the ciphertext in accordance with the chosen encoding rule.

34. The method of claim 33 wherein the configuration is inverse iterated to generate the ciphertext and the decryption is carried out by forward iteration.

35. The method of claim 32 wherein the dynamical system is a cellular automaton.

36. A method for authenticating information comprising the steps of
   encrypting a message using a first secret key shared between a sender and a recipient of the message;
   encrypting, using a second secret key shared between the sender and a third party, the message encrypted by said first secret key as well as other information;
   sending the encrypted message and other information to the third party for decryption of said other information and for separating therefrom the encrypted message encrypted by the first key; and
   transmitting the message encrypted by said first key from said first party to said recipient.

37. The method of claim 36 wherein other information is address information.

38. The method of claim 36 wherein the other information is authentication information.

39. The method of claim 36 further comprising the step of said third party encrypting the message and other information using a third key shared between the third party and the recipient.

40. The method of claim 36 wherein the message after encryption using the second key is transmitted to the recipient who then transmits it to the third party.

41. The method of claim 40 further comprising the step of said third party decrypting the encrypted information to obtain the message encrypted using said first secret key and transmitting the encrypted message to the recipient as information encrypted by using a third secret key shared between the third party and the recipient.

42. The method of claim 40 further comprising the step of including authentication information in the information encrypted using said third secret key.

43. The method of claim 36 wherein the keys are selected from a plurality of current-key dynamical systems to be used as current keys for encryption;

a current state of the chosen current-key dynamical systems being defined in correspondence with at least a portion of the message and information to be encrypted; and further comprising the steps of applying said selected one of said current-key dynamical systems over a selected number of iteration cycles to produce from said current state a new state of said at least one of said current-key dynamical systems, said new state representing an encryption of the information.

44. The method of claim 43 wherein said other information is inserted at an iteration cycle.

* * * * *